(12) United States Patent
Simpson et al.

(10) Patent No.: US 12,118,614 B1
(45) Date of Patent: Oct. 15, 2024

(54) SYSTEMS AND METHODS FOR ELECTRONIC TRADE ORDER ROUTING

(71) Applicant: BlackRock, Inc., New York, NY (US)

(72) Inventors: Shawn Simpson, New York, NY (US); Jingxin Xi, Jersey City, NJ (US); Donald Weidner, New York, NY (US); Trevor Hastie, Palo Alto, CA (US); Robert Tibshirani, Stanford, CA (US)

(73) Assignee: BlackRock, Inc., New York, NY (US)

( * ) Notice: Subject to any disclaimer, the term of this patent is extended or adjusted under 35 U.S.C. 154(b) by 90 days.

(21) Appl. No.: 17/847,055

(22) Filed: Jun. 22, 2022

Related U.S. Application Data

(60) Provisional application No. 63/256,378, filed on Oct. 15, 2021, provisional application No. 63/256,354, filed on Oct. 15, 2021, provisional application No. 63/256,316, filed on Oct. 15, 2021.

(51) Int. Cl.
*G06Q 40/04* (2012.01)
*G06F 18/2415* (2023.01)

(52) U.S. Cl.
CPC ......... *G06Q 40/04* (2013.01); *G06F 18/2415* (2023.01)

(58) Field of Classification Search
USPC ........................................................ 705/37
See application file for complete search history.

(56) References Cited

U.S. PATENT DOCUMENTS

| | | | |
|---|---|---|---|
| 5,924,082 A | 7/1999 | Silverman et al. | |
| 8,095,455 B2 * | 1/2012 | Shapiro et al. | 705/37 |
| 8,296,221 B1 * | 10/2012 | Waelbroeck et al. | 705/37 |
| 8,412,617 B1 * | 4/2013 | Waelbroeck et al. | 705/37 |
| 8,433,645 B1 * | 4/2013 | Waelbroeck et al. | 705/37 |
| 10,600,121 B1 * | 3/2020 | Malamut et al. | |
| 2011/0258100 A1 * | 10/2011 | Krishna et al. | 705/37 |
| 2016/0343052 A1 | 11/2016 | Hudson et al. | |

OTHER PUBLICATIONS

Rama Cont et al., Optimal Order Placement in Limit Order Markets, Oct. 4, 2012, arXiv.org. (Year: 2012).*

* cited by examiner

*Primary Examiner* — Scott C Anderson
*Assistant Examiner* — George N. Proios
(74) *Attorney, Agent, or Firm* — Haynes and Boone, LLP

(57) ABSTRACT

The present application generally relates to electronic trading systems, and more specifically to systems and methods for electronic trade order routing. Specifically, electronic trade orders may be divided into a first set and a second set. The first set of trade orders are executed with ad hoc execution styles. For the second set, execution style recommendations are generated in a form of a lookup table for the second set of trade orders according to a testing routing strategy. The second set of trade orders are executed with recommended execution styles. A difference between performance metrics among the first set of trade orders and the second set of trade orders is computed. A decision on whether to adopt the recommended execution style is generated based at least in part on the computed difference.

20 Claims, 15 Drawing Sheets

Trade Order Routing Pipeline + Models 104, 105

- Pipelines to create joined data for training + prediction
- IS Models
- Classifier Model
- Combination strategy

Daily Delivery File 125

- Generated daily overnight
- Flattened over CUSIP, Side, Size Bucket – bucketing does not drop model performance

| Date | CUSIP | Side | Size Bucket | Style Rec |
|---|---|---|---|---|
| 01/15/20 | 0X084DAJ9 | Buy | 1M-2M | RFQ |
| 01/15/20 | 0X084DAJ9 | Sell | 1M-2M | RFQ |
| 01/15/20 | 98877DAB1 | Buy | 2M-5M | Voice |
| 01/15/20 | 0258M0EG0 | Buy | 300k-500k | Auto |
| ... | ... | ... | ... | ... |

Figure 3B

SYSTEMS AND METHODS FOR ELECTRONIC TRADE ORDER ROUTING

CROSS-REFERENCE(S)

The application is a nonprovisional of and claims priority to 35 U.S.C. 119 to U.S. provisional application Nos. 63/256,316, 63/256,354 and 63/256,378, all filed Oct. 15, 2021.

This application is related to U.S. nonprovisional application Ser. Nos. 17/847,017 and 17/847,044, filed on the same day.

All of the aforementioned applications are hereby expressly incorporated by reference herein in their entirety.

TECHNICAL FIELD

The present application generally relates to electronic trading systems, and more specifically to systems and methods for electronic trade order routing.

BACKGROUND

Trade orders refer to the different types of orders that can be placed on trading exchange or over-the-counter for financial assets, such as stocks or futures contracts. Trade execution options often include: (i) manual execution, e.g., the trader may manually execute a trader order; (ii) Request For Quote—"RFQ" a certain way to ask a trade counterparty for an offer of a given financial instrument from the counterparty, made available by Approved Publication Arrangement (APA) by the stock markets itself or by Financial data vendors; and (iii) automatic execution via an automatic trading platform without human intervention. Fixed income traders generally make trade execution style decisions manually based on their expertise, order attributes, and market conditions. Such manual decision process largely slows down the trading effort and compromises system efficiency of an electronic trading system.

BRIEF DESCRIPTION OF THE DRAWINGS

FIGS. 3A-3B show a simplified diagram illustrating a process of trade order routing, according to one embodiment described herein.

Figure 1:
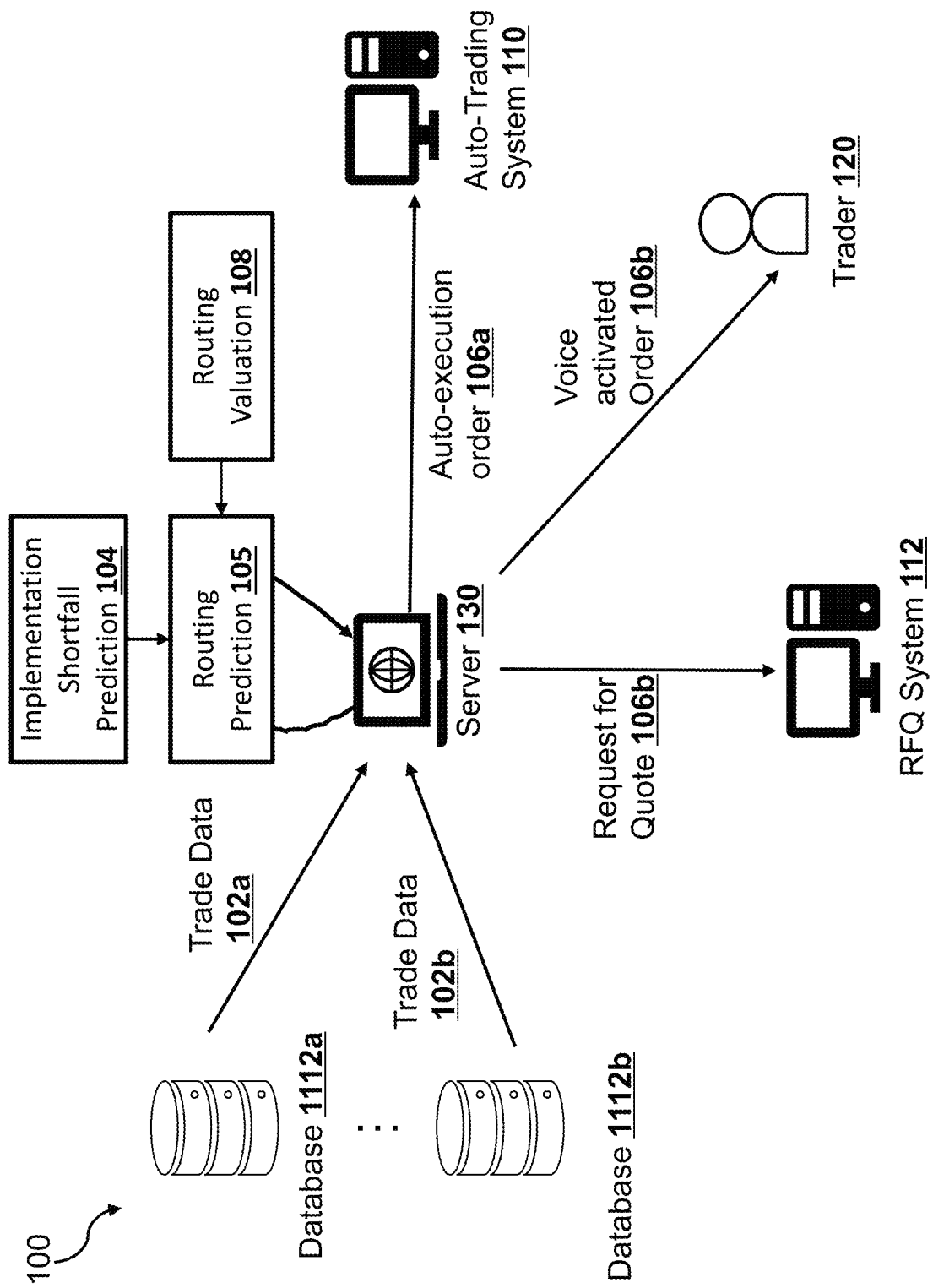
FIG. 1 is a simplified diagram illustrating data exchange between a server and other affiliated entities for trade order routing, according to one embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

As used herein, the term "network" may comprise any hardware or software-based framework that includes any artificial intelligence network or system, neural network or system and/or any training or learning models implemented thereon or therewith.

As used herein, the term "module" may comprise hardware or software-based framework that performs one or more functions. In some embodiments, the module may be implemented on one or more neural networks.

As used herein, the term "substantially" refers to a characteristic that achieve a certain property for the most part. For example, a set of variables that maximizes a numerical approximation of an objective function may be referred to as substantially maximizes the original objective function.

In existing trading systems, traders may make many decisions between the time an order is raised to the time of final trade execution. Decisions may include how to size and time the order, whether to execute in-competition, how many dealers to approach for a quote, or what venue to choose for execution. Currently fixed income traders make trade execution style decisions manually based on their expertise, order attributes, and market conditions. Historical decisions, order, market, and performance data are not yet incorporated in an automated, scalable way to make trade order routing decisions.

Specifically, investment Grade (IG) bonds, in particular, are a product category for trading with limited existing work on routing algorithms. Traders can alter these orders via merging multiple orders together, or by splitting an order into multiple orders and trading portions of it over time.

During this process traders may choose an execution style, e.g., Auto, RFQ or Voice. "Voice" refers to a manual trade execution style via direct deal with a counterparty, e.g., by a trader calling up the counterparty to make a deal. "RFQ" refers to an execution style by which trader makes a request for quote via a vendor such as MarketAxess or Tradeweb. The request goes into an in-competition channel, where multiple (around 50-100) brokers are requested for and return quotes for a given trade. The trader then chooses to execute with the broker who returns the best price. "Auto" refers to an execution style in which a trade is automatically executed with the best price counterparty via an RFQ channel. Trades today are setup to meet certain rules-based criteria—regarding size and liquidity, for instance—in order to be sent for Auto execution. It has been observed that Voice trades require the most hands-on trader effort and are the least automated style of trade. RFQ trades require a limited amount of trader action (multi-touch), and Auto trades are the most automated and necessitate the least degree of trader effort (one-touch, and/or the like).

The IG market is becoming more transparent, providing rich data sources to leverage for algorithmic approaches. Thus, there is a need to develop a smart order routing (SOR) algorithm that automatically makes recommendations on how to push trades down a route—i.e., a pathway of execution decisions.

Example embodiments of the electronic trade order routing mechanism may include a method of routing an incoming electronic trade order. The method comprises receiving, at a communication interface, information of the incoming electronic trade order; extracting, by a processor, a vector of attributes from the received information; generating, based on the vector of attributes, a respective probability indicating a likelihood that the incoming electronic trade order is to be executed under each execution style from a set of execution styles; determining, for each execution style, an estimate of an implementation shortfall metric (and/or any transaction cost or other quantitative performance metric) for the incoming electronic trade order being executed under the respective execution style; selecting, from the set of execution styles, a recommended execution style from the set of execution styles that minimizes a combined metric computed based on the estimate of implementation shortfall metric subject to a threshold requirement placed on respective probabilities; and transmitting, via the communication interface, an electronic message to a trading platform causing the incoming electronic trade order to be executed under the recommended execution style.

Specifically, a routing algorithm may generate an execution style recommendation for incoming IG corporate orders. For example, the style recommendation may be shown as a new column in the trading application dashboard that suggests a course of action to traders for each order. In one implementation, automatic decision making may occur based on the style recommendation. Or, traders are recommended to follow the suggestion but are free to execute via a different style if they see fit or market conditions necessitate it.

In one embodiment, the routing algorithm receives historical patterns of trade costs and is trained to recommend styles based on trade costs. Trade costs may be represented by execution implementation shortfall (IS), which gives the signed proportional difference between the execution price and the market price of a bond at time of execution, measured in basis points. For example, Voice trades take up time from traders, due to the need to reach out directly to a counterparty to make an agreement. To leverage trader expertise most effectively, relatively more of their time may be allocated to high value, difficult or risky trades—and less time on trades that can safely be executed via RFQ or Auto channels. These efficiencies should also allow the trading desks to scale more seamlessly to increasing order flows. For another example, as electronic channels tend to be associated with lower costs, in aggregate the routing algorithm may recommend a higher proportion of trades to Auto or RFQ channels.

In one embodiment, performance metrics (e.g., implementation shortfalls, cost, sales, and/or the like) may be defined at the beginning of projects to measure the impact of a project decision, e.g., the trade order routing decision. AB tests and/or other statistical experiments may measure the post-model deployment value of these performance metrics against control baselines to properly assess impact. For example, for the trade order routing selection described in FIGS. 1-8, a cost-based outcome metric (execution implementation shortfall) may be measurable post-execution for every trade which may then be used to assess impact in an AB Test. Example parameters that may be fed into the AB test include a putative size of the differential that is to be detected in the outcome of the test, the acceptable error rates for the test, the test statistic and its distribution, and/or the like. Pre-model deployment data may be obtained to obtain an estimation of any control group statistics, an estimation of the accrual rate of observation units based on the planned assignment strategy, and how the above influences the total time needed to run the test.

System Overview

FIG. 1 is a simplified diagram illustrating data exchange between a server and other affiliated entities for trade order routing, according to one embodiment. Diagram 100 shows a server 130, various data sources (databases) 103*a-n*, an auto-trading system 110, an RFQ system 115, a trader 120 operating a trading application, and/or the like interact with each other, e.g., via a communication network. In diagram 100, the number of data sources 103*a-n*, are shown for illustrative purposes, while any number of databases may be communicative with the server 130.

In one embodiment, the server 130 may receive trade data 102*a-n*, e.g., relating to an IG bond trade order from data sources 103*a-n* via a communication network. The data sources 103*a-n* may be integrated with the server 130 or may be one or more online data sources that are external to the server 130. For example, the data sources 103*a-n* may include a Trade Reporting and Compliance Engine (TRACE), MarketAxess, and/or the like.

The trade data 102*a-n* may include historical trade data used for post-trade reporting and analysis across multiple asset classes, such as but not limited to trade-level size, side, execution style, execution IS, Committee on Uniform Securities Identification Procedures (CUSIP) number, execution time, and/or the like. The trade data 102*a-n* may further include vendor data containing interest shown by dealers in transacting bonds with the server 130 at a given price or volume, via dealer pings, such as but not limited to desired prices, spreads, volumes per CUSIP over time, and/or the like. The trade data 102*a-n* may further include vendor provided (e.g., MarketAxess) data on FINRA required reporting of over-the-counter bond transactions in the U.S., such as but not limited to transacted prices, yields, spreads, quantities, estimated quantities per CUSIP over time, and/or the like. The trade data 102*a-n* may further include security level information on equity shares (includes fixed income, despite the name), such as but not limited to shares outstanding per CUSIP over time, and/or the like. The trade data 102*a-n* may further include security level risk liquidity risk analytics generated from transaction cost models, such as but not limited to forecast average daily volume, expected transaction costs per CUSIP over time, and/or the like. The trade data 102a-n may further include a relationship table between securities and their issuers, including entries such as but not limited to CUSIP-level issuer, amount issued, convertibility status, and/or the like. The trade data 102a-n may further include primary computed analytical parameters per security (e.g. duration, convexity, etc), such as but not limited to spread duration per CUSIP over time, and/or the like. The trade data 102a-n may further include generic security-level information across all securities held in the investment portfolios, such as but not limited to CUSIP-level issue date, maturity date, coupon, fixed vs float, 144A status, and/or the like. The trade data 102a-n may further include price and analytics data per security, such as but not limited to price info per CUSIP over time plus pricing information for different types of market indices, and/or the like.

In one embodiment, the server 130 may receive inputs of the trade information 102a-n for an implementation shortfall (IS) prediction 104 and a routing prediction module 105. The IS prediction module 104 may compute, based on the received trade information 102a-n, an IS value based on signed proportional difference between the execution price and the market price of a bond at time of execution:

$$IS = (-1 \text{ if sell}) \times \frac{\text{tade price} - \text{market price}}{\text{market price}}$$

The IS metric is measurable at a per trade level and acts as one of the supervising responses for trade level modeling.

The routing prediction module 105 may then generate a prediction on the execution style based at least in part on the IS metric generated by the IS prediction module 104. For example, intuitively, relatively more of traders' time may be allocated to high value, difficult or risky trades, for Voice execution—and less time on trades that can safely be executed via RFQ or Auto channels.

In one embodiment, the server 130, based on the execution style recommendation, may route an auto-execution order 106a to an auto-trading system 110. Or alternatively, may initiate a voice-activated order 106b to the trader 120. Or alternatively, may send a RFQ request to an RFQ system 115.

In one embodiment, the server 130 may route the orders 106a-c automatically based on an execution decision made by the routing prediction module 105. In another embodiment, the server 130 may present the execution style recommendation generated by the routing prediction module 105 via a user interface application to the trader 120 to execute.

Figure 2:
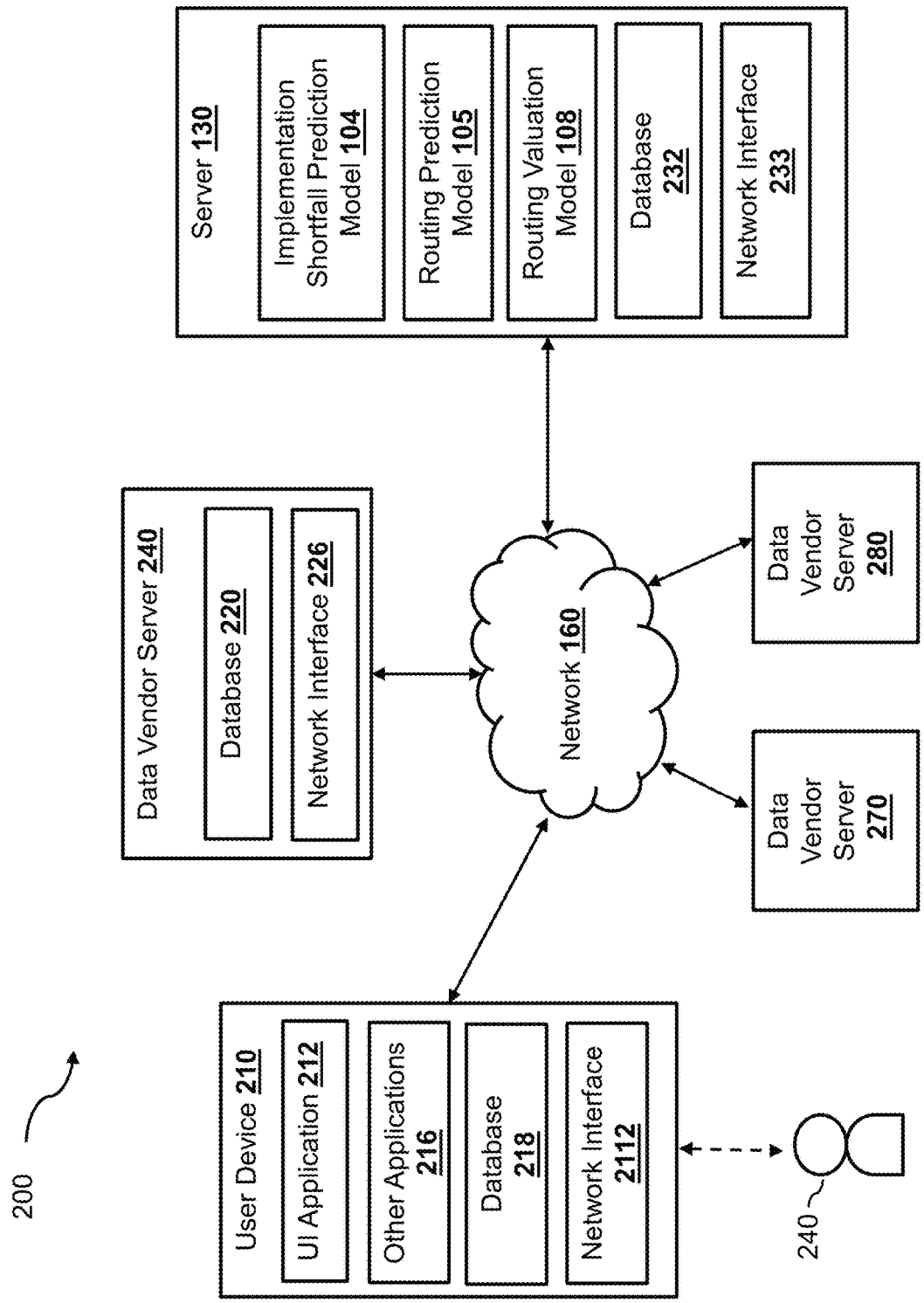
FIG. 2 is a simplified diagram illustrating a network environment that the server for trade order routing may be situated, according to one embodiment described herein.

FIG. 2 is a block diagram 200 of a networked system suitable for implementing the processes described in FIG. 1 and other embodiments described herein, according to an embodiment. In one embodiment, block diagram 200 shows a system including the user device 210 which may be operated by user (trader) 240, data vendor servers 240, 270 and 280, server 130, and other forms of devices, servers, and/or software components that operate to perform various methodologies in accordance with the described embodiments. Exemplary devices and servers may include device, stand-alone, and enterprise-class servers, operating an OS such as a MICROSOFT® OS, a UNIX® OS, a LINUX® OS, or other suitable device and/or server-based OS. It can be appreciated that the devices and/or servers illustrated in FIG. 2 may be deployed in other ways and that the operations performed, and/or the services provided by such devices and/or servers may be combined or separated for a given embodiment and may be performed by a greater number or fewer number of devices and/or servers. One or more devices and/or servers may be operated and/or maintained by the same or different entities.

The user device 210, data vendor servers 240, 270 and 280, and the server 130 may communicate with each other over a network 160. User device 210 may be utilized by a user 240 (e.g., a trader, etc.) to access the various features available for user device 210, which may include processes and/or applications associated with the server 130 to receive a recommended execution style output.

User device 210, data vendor server 240, and the server 130 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 200, and/or accessible over network 160.

User device 210 may be implemented as a communication device that may utilize appropriate hardware and software configured for wired and/or wireless communication with data vendor server 240 and/or the server 130. For example, in one embodiment, user device 210 may be implemented as a personal computer (PC), a smart phone, laptop/tablet computer, wristwatch with appropriate computer hardware resources, eyeglasses with appropriate computer hardware (e.g., GOOGLE GLASS®), other type of wearable computing device, implantable communication devices, and/or other types of computing devices capable of transmitting and/or receiving data, such as an IPAD® from APPLE®. Although only one communication device is shown, a plurality of communication devices may function similarly.

User device 210 of FIG. 2 contains a user interface (UI) application 212, and/or other applications 216, which may correspond to executable processes, procedures, and/or applications with associated hardware. For example, the user device 210 may receive a message indicating information of a trade order or a recommended execution style from the server 130 and display the message via the UI application 212. In other embodiments, user device 210 may include additional or different modules having specialized hardware and/or software as required.

In various embodiments, user device 210 includes other applications 216 as may be desired in particular embodiments to provide features to user device 210. For example, other applications 216 may include security applications for implementing client-side security features, programmatic client applications for interfacing with appropriate application programming interfaces (APIs) over network 160, or other types of applications. Other applications 216 may also include communication applications, such as email, texting, voice, social networking, and IM applications that allow a user to send and receive emails, calls, texts, and other notifications through network 160. For example, the other application 216 may be an email or instant messaging application that receives a recommended execution style from the server 130. Other applications 216 may include device interfaces and other display modules that may receive input and/or output information. For example, other applications 216 may contain software programs for asset management, executable by a processor, including a graphical user interface (GUI) configured to provide an interface to the user 240 to view real estate listings.

User device 210 may further include database 218 stored in a transitory and/or non-transitory memory of user device 210, which may store various applications and data and be utilized during execution of various modules of user device 210. Database 218 may store user profile relating to the user 240, trade order details, trade order execution information, and/or the like. In some embodiments, database 218 may be local to user device 210. However, in other embodiments, database 218 may be external to user device 210 and accessible by user device 210, including cloud storage systems and/or databases that are accessible over network 160.

User device 210 includes at least one network interface component 219 adapted to communicate with data vendor server 240 and/or the server 130. In various embodiments, network interface component 219 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Data vendor server 240 may correspond to a server that hosts one or more of the databases 103a-n (or collectively referred to as 103) to provide asset information 102a-n to the server 130. For example, the data vendor server 240 may be associated with a trade database 220, which may supply information of the trade order to the server 130.

The data vendor server 240 includes at least one network interface component 226 adapted to communicate with user device 210 and/or the server 130. In various embodiments, network interface component 226 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. For example, in one implementation, the data vendor server 240 may send asset information from the database 220, via the network interface 226, to the server 130.

The server 130 may be housed with the IS prediction module 104 and the routing prediction module 105. In some implementations, modules 104 and 105 may receive trade information from database 220 at the data vendor server 240 via the network 160 and implement a multi-class classification prediction model such as a statistical model and/or a machine learning model to generate a predicted execution style. The generated execution style prediction may also be sent to the user device 210 for review by the user 240 via the network 160.

The database 232 may be stored in a transitory and/or non-transitory memory of the server 130. In various embodiments, for example, the database 232 may be a trade information database storing information relating to various trade, macroeconomic data, and/or the like. In one implementation, the database 232 may store parameters of the modules 104 and 105.

In some embodiments, database 232 may be local to the server 130. However, in other embodiments, database 232 may be external to the server 130 and accessible by the server 130, including cloud storage systems and/or databases that are accessible over network 160.

The server 130 includes at least one network interface component 233 adapted to communicate with user device 210 and/or data vendor servers 240, 270 or 280 over network 160. In various embodiments, network interface component 233 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 160 may be implemented as a single network or a combination of multiple networks. For example, in various embodiments, network 160 may include the Internet or one or more intranets, landline networks, wireless networks, and/or other appropriate types of networks. Thus, network 160 may correspond to small scale communication networks, such as a private or local area network, or a larger scale network, such as a wide area network or the Internet, accessible by the various components of system 200.

IG Bond Order Routing

Figure 3A:
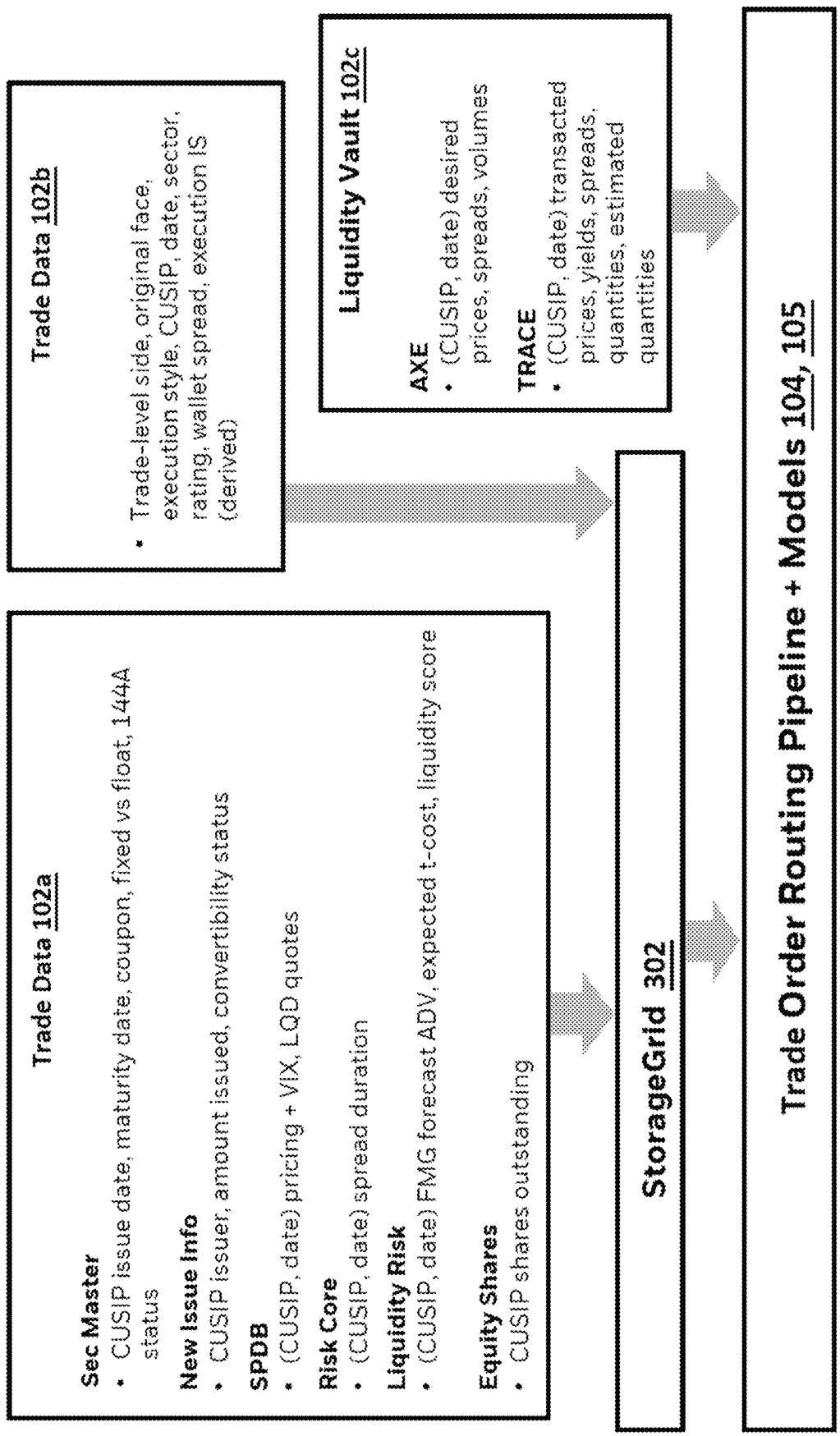

FIG. 3A shows a simplified diagram illustrating example inputs to the trade order routing modules, according to one embodiment described herein. In one embodiment, both the IS module 104 and the routing prediction module 105 generate forward looking predictions based on pre-execution trade-level attributes. All input features are measurable at a per-trade level, and measurable prior to trade execution—specifically, prior to the time when the order is raised.

For example, example trade data 102a may include generic security-level information such as but not limited to CUSIP-level issue date, maturity date, coupon, fixed vs float, 144A status, and/or the like. Example trade data 102a may further include new issuer information, such as CUSIP issuer, amount issued, convertibility status, and/or the like; pricing information such as (CUSIP, date) level pricing, price info per CUSIP over time plus pricing information for market indices, and/or the like; risk score information such as (CUSIP, date) level spread duration, and/or the like; liquidity risk information such as (CUSIP, date) level forecast, expected t-cost, and/or the like; equity shares information such as CUSIP level shares outstanding, and/or the like. On the trade-level, trade data 102b may include trade-level side, original face, execution style, CUSIP, date, sector, rating, wallet spread, execution IS (derived), and/or the like. On the (CUSIP, date) level, the trade data 102c may include (CUSIP, date) level desired prices, spreads, volumes, transacted prices, yields, spreads, quantities, estimated quantities, and/or the like.

In one embodiment, some trade data may be input to a preprocessing/storage unit 302, which organizes and converts received trade data to features observed at a trade-level, CUSIP-level, day-level, or at a (CUSIP, day)-level. (CUSIP, day)-level features describe the attributes of a particular bond (CUSIP) and/or market conditions with respect to that bond on the day a trade happens. For example, (CUSIP, day) or day-level features are generated daily overnight, so correspond to the most recently known measurements as of yesterday, the day prior to the trade, which is referred to as T-1. Examples of such features include bond tenor, daily amount outstanding for that CUSIP, previous close price of the bond, and the daily value of the CBOE Volatility Index (VIX). Trade-level features are those that correspond to individual historical trades at an intraday level, e.g. the size ($1M) or side (buy vs sell) for that trade. All levels of observation can be joined to create a trade-level feature attribute vector xi via the CUSIP and date associated with trade i. All features are measurable at the time an order is raised; only IS and style are measured post-execution, but these values are outputs for IS and propensity models, respectively.

In one embodiment, the preprocessing unit 302 may derive autoregressive (AR)-style inputs as part of our feature set, which represent lagged IS measurements. These may be employed by the IS Models but not the Propensity Model, as the latter is built without regard to trade performance. The rationale for including these lagged inputs is three-fold: (1) IS demonstrates significant autocorrelation, in that, at a CUSIP-level, the IS yesterday is indicative of the IS today. (2) AR terms are based on previous days—i.e. T-1 or before—and are thus measurable at the time an order is raised on the current day T; these inputs are not subject to look-ahead bias. (3) For time-dependent forecasting it is common practice to include multiple lagged terms as predictors to capture past signals in both the short- and long-term.

Thus, given the CUSIP for trade i, say ci, on day T the mean execution IS over all trades with CUSIP ci from the prior day, $\bar{y}_{ci,T-1}$ as an AR-style input for the IS Models. In some situations, not all CUSIPs are traded on consecutive days, so relying on (ci, T-1) as the level of aggregation leads to considerable missingness. To minimize missingness, groups of trades similar to trade i of interest and aggregate within each group. Bond attributes (sector, tenor bucket, rating bucket) and trade attributes (execution style, side) are used to create a coarse grid over the feature space and consider trades within each grid cell to be in the same cohort. If trade i falls within cohort $g_i=g$, the AR-style IS terms associated with i take the form $\overline{yy}_{g,[T-w,T-1]}$, where the mean is taken over all trades k for which $g_k=g$ that occur within [T-w, T-1] for window length w. A variety of lookback windows lengths over which to average the IS values may be used, e.g. [T-7, T-1] or [T-30, T-1] to capture signals in both the near and far distant past.

In one embodiment, the preprocessing unit 302 may derive generalized momentum features. These are derived by comparing the mean IS for trades with CUSIP ci from the previous day, $\bar{y}_{ci,T-1}$, to a benchmark, and computing a z-score-style metric based on this difference by normalizing by the standard deviation. For example, the varieties of momentum features derived include time series momentum indicating how the prior day mean compares to the mean over historical time windows of length w=3, 7, and 30 days:

$$\phi((\bar{y}_{ci,T-1}-\hat{y}_{ci,[T-w,T-1]})/\widehat{SD}(\bar{y}_{ci,[T-w,T-1]}))$$

Where $\phi(\cdot)$ represents the cumulative density function of a standard normal distribution, which maps the value to [0,1] to shrink the effect of extreme values that occur when the denominator is small.

Another example momentum includes cross sectional momentum which indicates how the prior day mean at a CUSIP level $\bar{y}_{ci,T-1}$ compares to the mean at a cohort level:

$$\phi((\bar{y}_{ci,T-1}-\hat{y}_{g,T-1})/\widehat{SD}(\bar{y}_{g,T-1})).$$

The cross sectional momentum also indicates how the cohort level prior day mean, $\bar{y}_{g,T-1}$ compares against an even coarser cohort based on style and side only, analogous to the above. Other derived features include metrics like participation rate (face value/amount outstanding), the log of the trade notional, or the % of the lifetime of the bond that has elapsed, and/or the like.

In one embodiment, part of the input feature logic includes their encoding—i.e. categorical, numerical, binary, etc. For numerical features robust scaling may be applied, e.g., the top and bottom 0.5% of values to help reduce extreme values, then subtract the median and scale the data according to the interquantile range (IQR). Categorical and binary features are transformed via one-hot encoding. Most features naturally fall into categorical or numerical based on their underlying measurements, others are numerical but then discretized into bins (ordinal). In discretization implementation, bins are derived based on even quantiles and represent each bin numerically via its midpoint on the original scale; these features are marked as "Robust Discretized".

Figure 4:
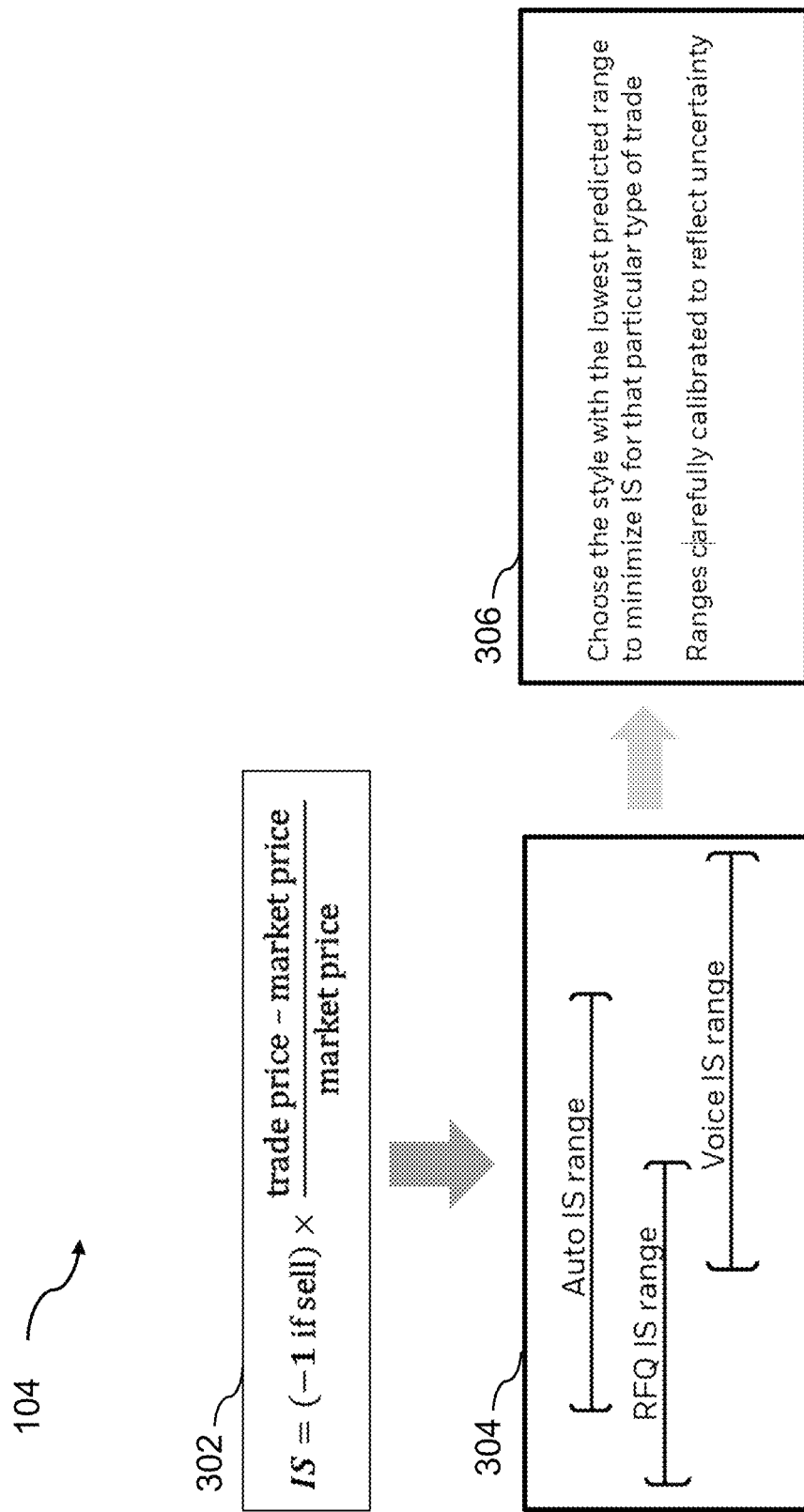
FIG. 4 is a simplified diagram illustrating an aspect of implementation shortfall, according to one embodiment described herein.
Figure 5:
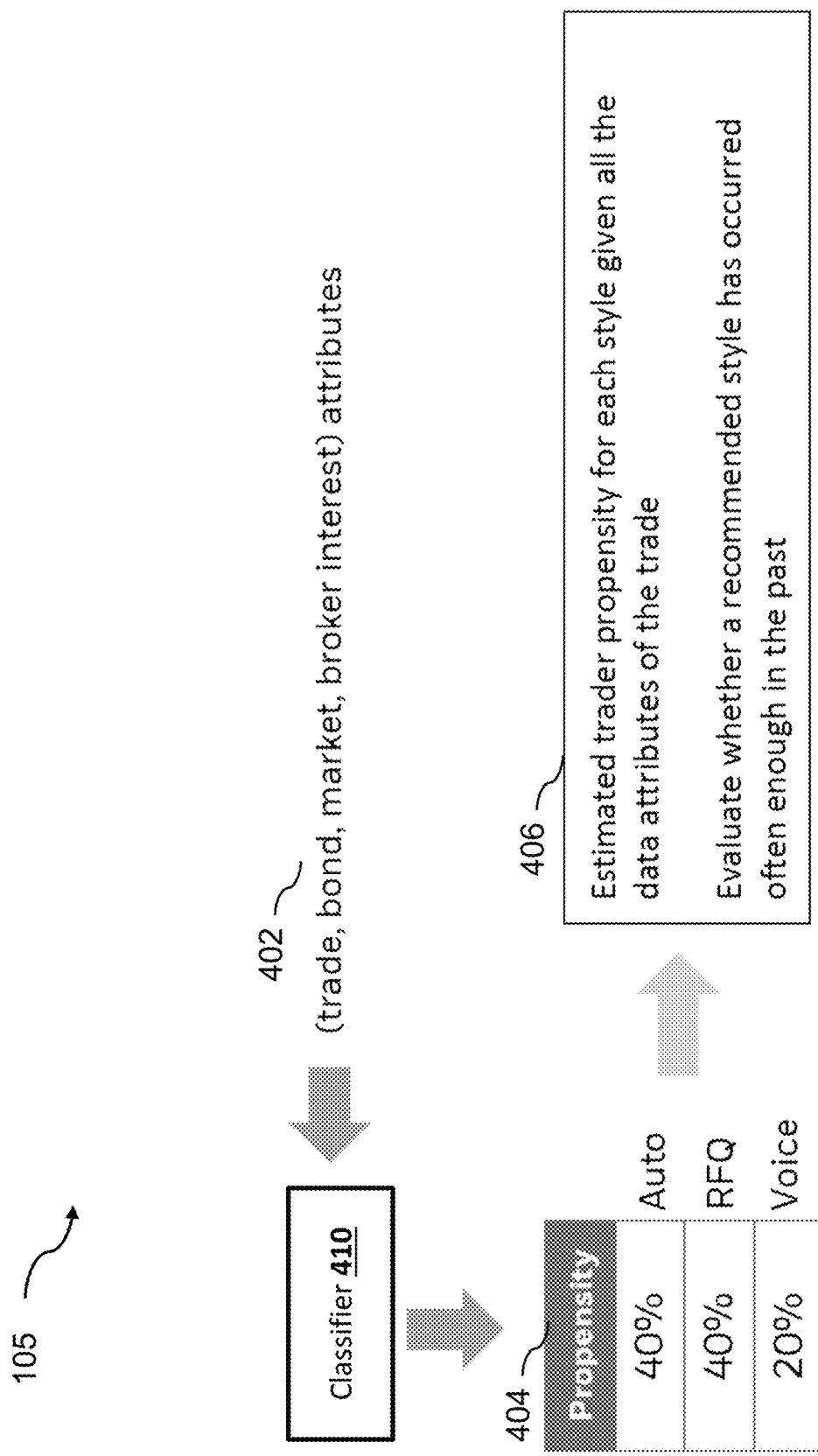
FIG. 5 is a simplified diagram illustrating generating propensity scores for routing options, according to one embodiment described herein.
Figure 6:
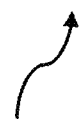
FIG. 6 is a simplified diagram illustrating an example input data structure, according to one embodiment described herein.

The preprocessed trade data features from the preprocessing module 302 and the liquidity information 102c are then sent to the trade order routing pipeline, including modules 104-105 for prediction, as further described in relation to FIGS. 4-6.

FIG. 3B shows a simplified diagram illustrating example outputs from the trade order routing modules 104 and 105 at server 130, according to one embodiment described herein. For example, the trader order routing pipeline 104 and 105, which may include an IS model 104, a multi-class classification model and/or a combined strategy model for the routing module 105, may generate an output of recommended execution style for a trade order.

In one embodiment, the output may be displayed to a trader via a user interface application, e.g., 212 of user device 210.

In one embodiment, the output may take a form of a daily delivery file 125 that is generated on a daily basis, and flatted over the CUSIP, side, size bucket attributes, and the respective recommended style.

FIG. 4 is a simplified diagram illustrating an aspect of the implementation shortfall prediction module 104, according to one embodiment described herein. In one embodiment, the IS metric may be computed, at server 130, at step 302. Specifically, the execution IS values may be calculated based on pricing data obtained from the trade data 102a-n, which contains intra-day bid-ask data for different instruments and markets.

As lower values of execution IS are indicative of better trade performance, for each incoming order, the execution style may be recommended in a manner that will lead to the lowest value of execution IS. If, given the unique attributes of a trade, IS that would occur under each style could be predicted, the style that minimizes IS may be recommended. Specifically, at step 304, three separate gradient boosting regression models, one for each style S, where S E {A (Auto), R (RFQ), V (Voice)}, may be employed to predict the respective IS (or a predicted IS range) if the trade order is executed under the respective style.

In one embodiment, a complete stratification by style may be implemented because: (1) there is potential for segmentation among the cost generation mechanism for each execution style; (2) for tree-based models, complete stratification is equivalent to forcing a first-level split by execution style.

Within a style S, for a particular trade i with i=1, ..., ns, and given a vector of trade attributes, $x_i^T=(x_{i1}, \ldots, x_{im})$, the IS model predicts execution IS for that trade under style S, $y_i^S$, both in the form of a point estimator $\hat{y}_i^S=E[y_i^S|x_i]$, the conditional mean IS for that trade, and in the form of a confidence interval [LS (xi), Us(xi)] for $\hat{y}_i^S$, with LS(xi) and Us(xi) being the lower and upper bounds, respectively.

In one embodiment, at step 306, an execution style may be recommended with the lowest predicted range to minimize IS for that particular type of trade. Certain types of trades are executed more often via particular styles. The statistical target for estimation would be that every flavor of trade is executed across all three styles with equal probability, resulting in similar coverage for each style across the full feature space of trades; however, this can hardly be realized in practice. To account for this, the IS module calibrates the IS intervals to properly reflect the uncertainty induced by the degree of historical coverage, as further illustrated in relation to FIG. 8. The IS module then incorporates historical probabilities for each style, given a trade's attributes via a propensity model, as discussed in relation to FIG. 6A.

In one implementation, the IS model 104 may be implemented by XGBoost, as described in Chen et al., XGBoost: A Scalable Tree Boosting System, in Proceedings of KDD conference, 2016.

FIG. 5 is a simplified diagram illustrating an example propensity model generating propensity scores for routing options, according to one embodiment described herein. The propensity model may encapsulate traders' existing decision patterns regarding execution style. For example, a trade-level model may be built supervised by execution style as the response. This model may be built without regard to IS or any trade performance measures.

In one embodiment, the propensity model may take a form as a classifier 410, which receives an input of (trade, bond, market, broker interest) attributes 402. Example input attributes 402 are shown in FIG. 6, which may include bond attributes (e.g., rating, duration, sector, coupon, tenor, original tenor, etc.), trade attributes (e.g., size, buy or sell, etc.), market conditions (e.g., LQD level, T-1 price, full wallet spread, recent IS level, etc.), status attributes (quantity, price, frequency, volatility, spread, etc.), outputs (e.g., expected cost, fixed impact, etc.), and/or the like. Additional input features to the classifier 410 may be similar to trade data 102a-c described in relation to FIG. 3.

The classifier 410 may then generate a classification distribution output 404 among the three possible execution styles, indicating a respective probability that the input trader order features is likely to be executed under the respective style. Specifically, consider a given trade i where i=1, ..., n, and its vector of attributes, $x_i^T=(x_{i1}, \ldots, x_{im})$. These attributes may or may not be the same with the input to the IS Model described in FIG. 4. Trade i has an execution style si E {A (Auto), R(RFQ), V(Voice)}, which is treat as a categorical response. As such the propensity model can be considered a multi-class classifier 410 with three possible outputs.

The model 410 estimates the probability of each execution style si given the vector of attributes of the trade xi, i.e. Pr(A|xi), Pr(R|xi), and Pr(V|xi). The estimates are denoted $\hat{p}_i^A$, $\hat{p}_i^R$, $\hat{p}_i^V$ respectively. These values sum to 1 as the response always takes on one of these three options. To choose a single style label, if desired, the style with the highest estimated probability may be recommended.

Similar to the IS model, XGBoost may be used to implement the classification to generate these estimates.

Figure 7:
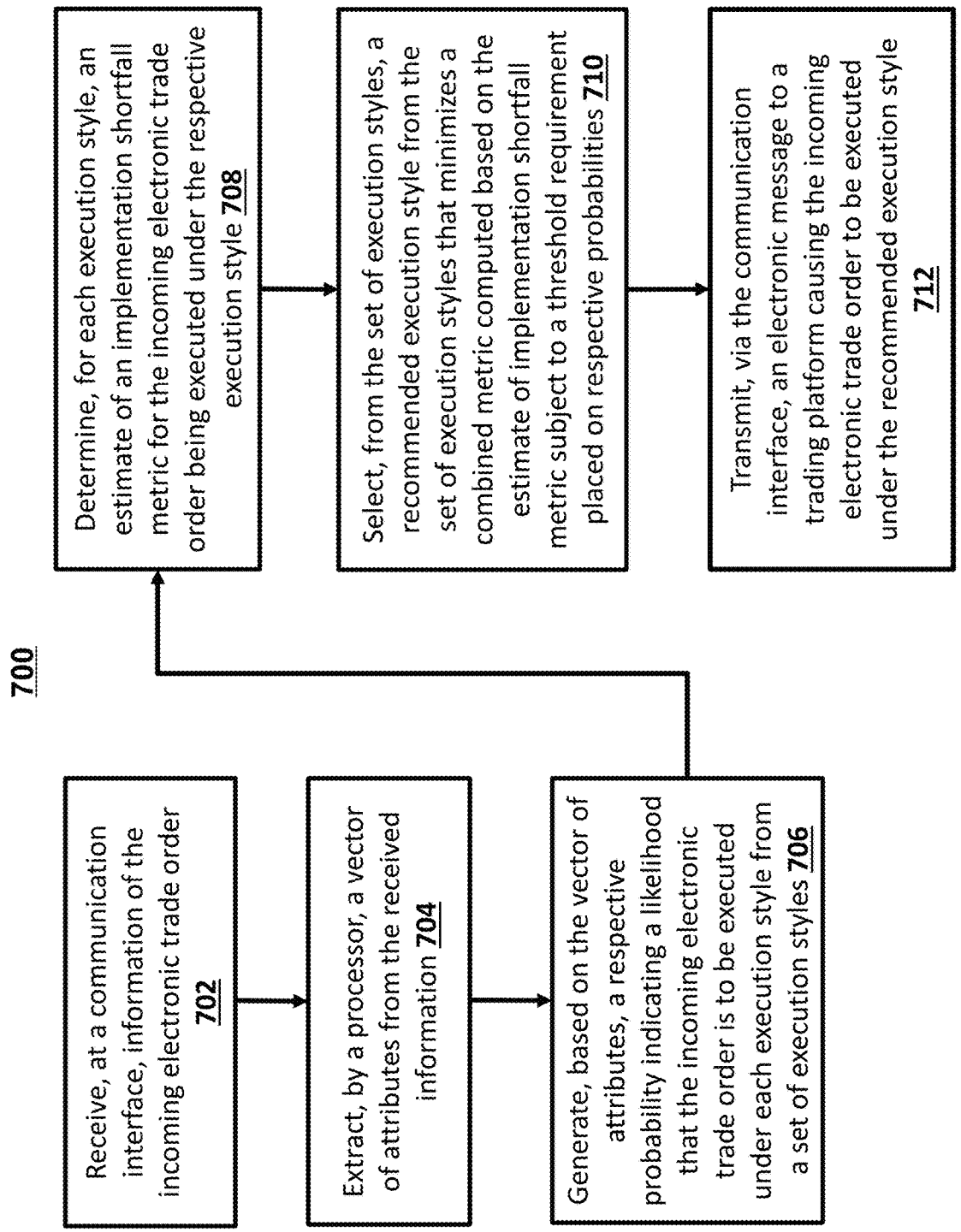
FIG. 7 is a simplified logic flow diagram illustrating a method of electronic trade order routing, according to one embodiment described herein.

FIG. 7 is a simplified logic flow diagram illustrating a method of electronic trade order routing, according to one embodiment described herein. One or more of the process 700 may be implemented, at least in part, in the form of executable code stored on non-transitory, tangible, machine-readable media that when run by one or more processors may cause the one or more processors to perform one or more of the processes. In some embodiments, process 700 may be performed by the trade order routing modules including 104 and 105 at server 130 in FIGS. 1-2. It is worth noting that additional processes, steps and/or implementations may be omitted, performed in a different sequence, or combined as desired or appropriate.

At step 702, information of an incoming trade order may be received at a communication interface. For example, the incoming trader order may comprise at least part of the trade data 102a-n described in FIG. 1.

At step 704, a vector of attributes may be extracted from the received information. For example, attributes may be extracted to form an input vector from the trade data 102a-n at the processing unit 302.

At step 706, a respective probability indicating a likelihood that the incoming trade order is to be executed under each execution style from a set of execution styles may be generated. For example, the propensity model 410 shown in FIG. 5A may generate the estimates $\hat{p}_i^A$, $\hat{p}_i^R$, $\hat{p}_i^V$ for Auto, Voice and RFQ styles, respectively.

At step 708, for each execution style, an estimate of an implementation shortfall metric for the incoming trade order being executed under the respective execution style is determined. For example, for each style S∈{A, R, V}, the IS Model 104 is used for that style to generate the prediction interval [LS (xi), US (xi)] and the IS estimate $\hat{y}_i^S$ if trade i were executed with style S.

At step 710, a recommended execution style is selected from the set of execution styles, which minimizes a combined metric computed based on the estimate of implementation shortfall metric subject to a threshold requirement placed on respective probabilities. For example, Let Oi ⊂ {A, R, V} be the opportunity set of styles that might be chosen to recommend for trade i. The set Oi will include only the styles whose propensity estimates are above some specified minimum value, i.e. S∈Oi only if $\hat{p}_i^S > p_0$, where p0 is a pre-defined threshold, e.g., the lowest propensity estimate acceptable for a candidate style. Amongst the candidate styles in Oi, the style si* that minimizes $$\hat{y}_i^S + \gamma(Us(x_i) - \hat{y}_i^S)$$

is selected, where $\gamma$ is a risk aversion parameter that penalizes higher levels of IS uncertainty.

In other words, step 710 may be implemented as:

Choose Oi ⊂ {A, R, V} s.t. ∀S∈$O_i$, $\hat{p}_i^S > p_0$

Recommend style $$s_i^* = \underset{s \in O_i}{\arg\min} \ \hat{y}_i^s + \gamma(U_S(x_i) - \hat{y}_i^s)$$

for trade i, where $p_0 \in [0,1]$ is the lowest acceptable propensity needed for a style to be considered for recommendation and $\gamma \geq 0$ controls the degree of risk aversion to uncertainty in IS.

Parameter $p_0$ controls which styles are in the opportunity set. If, given a trade i, the propensity estimate for a candidate style is less than p0, it is deemed too unlikely for that trade to have been traded with that style based on historical trading patterns; thus, it is not allowed in the opportunity set. As a result, the larger p0 is, the more conservative the recommendation is in that only high propensity styles—those very likely to be chosen historically—are considered viable; i.e. the larger p0 is the more we adhere to the status quo patterns. For example, a minimum parameter value of p0=0.15. Note that a natural range for p0 may be [0, 0.33].

The γ parameter controls the aversion to upside uncertainty in the IS estimates, which is reflected by the width of the upper half of the IS interval—i.e. US(xi)−$\hat{y}_i^S$. If γ=1 the combo strategy chooses $$s_i^* = \underset{s \in O_i}{\mathrm{argmin}} U_s(x_i),$$

the style with the lowest confidence interval upper bound from the candidates in the opportunity set. For example, γ=1.5 is set based on reviewing sample trades.

At step 712, an electronic message is transmitted via the communication interface to a trading platform causing the incoming trade order to be executed under the recommended execution style. For example, the generated recommended execution style may be presented to a trader for review via a UI application, who may in turn initiate the trade based on the recommended execution style. For another example, the recommended execution style may be automatically executed for the trade order by automatically transmitting the trading message to the trading platform with little human intervention.

Figure 8:
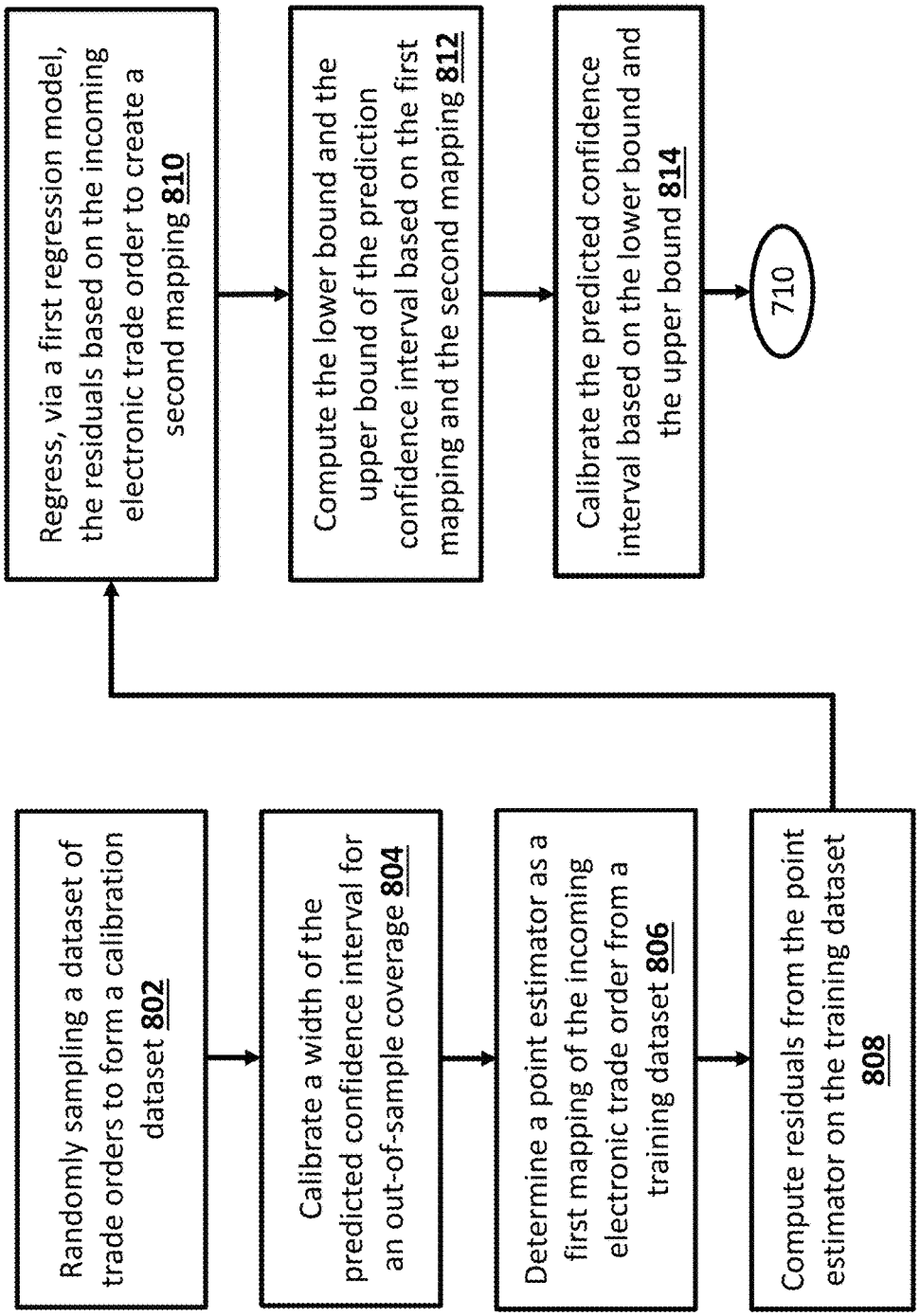
FIG. 8 is a simplified logic flow diagram illustrating an aspect of determining an estimate of the implementation shortfall metric for each execution style as shown in FIG. 7, according to one embodiment described herein.

FIG. 8 is a simplified logic flow diagram illustrating an aspect of calibrating a range of an estimate of the implementation shortfall metric for each execution style, according to one embodiment described herein. One or more of the process 800 may be implemented, at least in part, in the form of executable code stored on non-transitory, tangible, machine-readable media that when run by one or more processors may cause the one or more processors to perform one or more of the processes. In some embodiments, process 800 may be performed by the trade order routing modules including 104 and 105 at server 130 in FIGS. 1-2. It is worth noting that additional processes, steps and/or implementations may be omitted, performed in a different sequence, or combined as desired or appropriate.

At step 802, a dataset of trade orders may be randomly sampled from the original received trade data 102a-n to form a calibration dataset. In one implementation, the received trade data 102a-n may be divided into training and calibration sets. The training set may be used to train the IS model and the propensity model.

At step 804, a width of the predicted confidence interval for an out-of-sample coverage may be calibrated. For example, the calibration set may be used later on to calibrate confidence interval widths to achieve the right level of out-of-sample coverage.

At step 806, a point estimator may be determined as a first mapping of the incoming trade order from a training dataset. For example, a point estimator $\hat{y}_i = \hat{f}(x_i)$ via a XGBoost regression model that is trained on the training set.

At step 808, residuals may be computed from the point estimator on the training dataset.

At step 810, a regression model may be used to regress the residuals based on the incoming trade order to create a second mapping. For example, absolute residuals are calculated from $\hat{f}(x_i)$ on the training set, then those residuals are regressed on $x_i$ with another XGBoost regression model to create a second model, denoted by $\hat{g}(x_i)$. This secondary model estimates the degree of in-sample training error from the first model:

$$|y_i - \hat{f}(x_i)| \hat{g}(x_i) + \text{error}.$$

At step 812, the lower bound and the upper bound of the prediction confidence interval may be computed based on the first mapping and the second mapping. For example, the lower bound and the upper bound are computed based further on a first scalar and a second scalar selected in a way such that a resulting prediction confidence interval has a desired level of out-of-sample coverage. That is, for trade j in the calibration set, $\hat{f}(x_i)$ and $\hat{g}(x_i)$ may be calculated and scalars c1, c2 are selected such that the interval $$[\hat{f}(x_j) - c_1 \hat{g}(x_j), \hat{f}(x_j) + c_2 \hat{g}(x_j)]$$

has the desired level of out-of-sample coverage based on all $y_j$ in the calibration set. For example, 50% coverage may be used as the target.

In one implementation, a difference between the upper bound of the prediction confidence interval and the conditional mean implementation shortfall may be computed for the combined metric used in step 710 in FIG. 7. A weighted sum of the conditional mean implementation shortfall and the difference is computed, wherein the difference is weighted by a risk aversion parameter.

At step 814, the predicted confidence interval of the IS metric may be calibrated based on the lower bound and the upper bound. For example, for a new attribute vector x, $\hat{f}(x)$ is the prediction of E[y|x] and $[\hat{f}(x) - c1 \hat{g}(x), \hat{f}(x) + c2 \hat{g}(x)]$ is 50% prediction interval. The calibration step may be performed for the width of the intervals to correctly reflect out-of-sample error and ensure that coverage is as expected. The model $\hat{g}(x)$ estimates insample error based on absolute residuals from the training set, so if it is applied without calibrated scalar adjustment via c1 and c2 it will reflect in-sample rather than, as desired, out-of-sample error.

In one implementation, a target 50% confidence interval coverage is adopted due to the long-tailed nature of IS. Maintaining a high confidence interval coverage rate such as 95% means that extreme values must be catered to; very wide intervals are generated as a result. A moderate rate of 50% is thus chosen to reflect uncertainty without attempting to cover the most extreme values. All three styles target 50% coverage so that there are fair grounds for comparison between them.

The trade order routing selection mechanism described in FIGS. 1-8 may be assessed using an AB testing based evaluation mechanism before executing the selecting trade order routing option.

Figure 9:
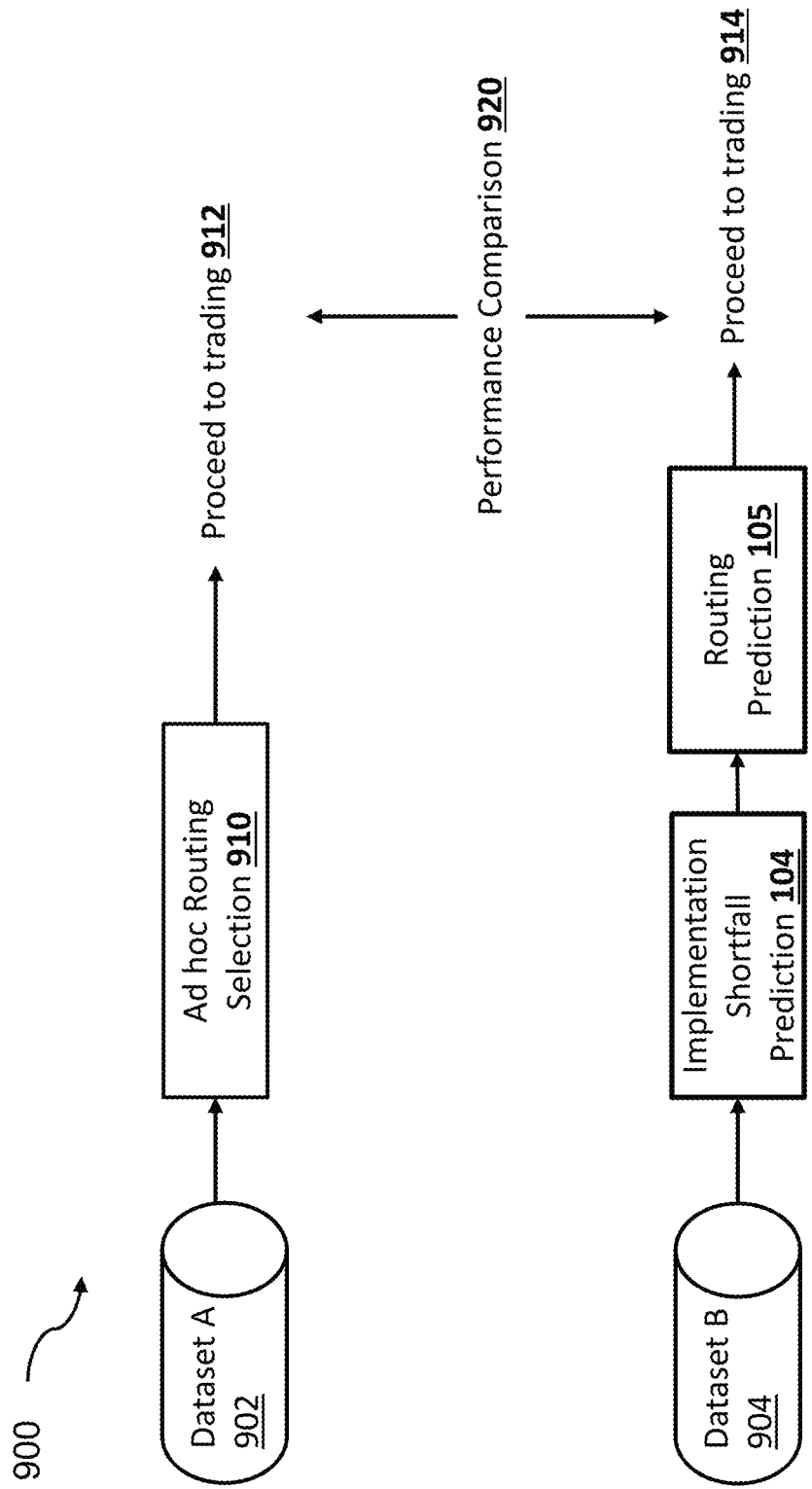
FIG. 9 is a simplified diagram illustrating an AB testing framework for trade order routing selection, according to one embodiment described herein.

FIG. 9 is a simplified diagram illustrating an AB testing framework 900 for trade order routing selection, according to one embodiment described herein. As described in FIGS. 1-8, trade order execution style recommendations may be determined by a prediction model and may then be delivered via a lookup table keyed by the data entry of (CUSIP, side, size bucket), where the side value indicates if the order is a buy or a sell, and the size category is an order size interval. The system may then process incoming orders based on the lookup table for a common key to retrieve the same trade order execution recommendation. For example, approximately 10000 CUSIPs×2 sides×22 sizes=440,000 delivery keys may be stored in the lookup table. The lookup table is re-generated daily overnight, based on the latest window of available historical trading data. Note that orders may be distributed unevenly with respect to keys, i.e. some keys will have many matching orders and others will match few to none.

As shown in diagram 900, AB test may be adopted to determine if the trade order execution recommendations may impact trade execution performance, as measured by execution implementation shortfalls (cost). It is noted that any other measurable metric such as cost, sales, and/or the like may be used in the AB test in place of or in combination with the implementation shortfall metric.

In one embodiment, the delivery keys stored in the lookup table may be randomized, and the incoming orders are randomly split into two datasets A (control set) 902 and B (test set) 904. Specifically, in dataset A 902, incoming trade orders are executed without recommendation, e.g., the routing decision is decided by a trader in an ad hoc manner at 910 without being exposed to any routing recommendation performed as described in FIG. 1-8, which is similar to what traders traditionally receive pre-deployment. The trader order may then proceed to trading at 912.

In dataset B 904, the trade order routing recommendation (Auto, RFQ or Voice as recommended at step 710 in FIG. 7) may be provided to a trader in a dashboard application. For example, an implementation shortfall prediction module 104 may be used to predict the implementation shortfall metric if a particular trader order is to be executed under Auto, RFQ, or Voice. A routing prediction module 105 may then predict the propensity that the particular trader order is to be executed using a particular style. Thus, as the trader may proceed to trading according to the trader order style recommendation at step 914, the trader order may then be executed by the trader post-deployment of the trade order routing recommendation mechanism described in FIGS. 1-8.

Performance comparison 920 may be conducted between the two types of trader order routing from dataset A and dataset B. Specifically, the difference $\Delta=\mu_A-\mu_B$ between the mean execution implementation shortfall for Control ($\mu_A$) vs. Treatment ($\mu_B$) is computed, i.e., a hypothesis test of $H_0$: $\Delta=0$ versus $H_A$: $\Delta \neq 0$.

In one embodiment, a test statistic may be computed based on the difference between implementation shortfall metrics and the variances of implementation shortfalls generated from dataset A and dataset B, respectively:

$$z = \frac{\overline{IS}_A - \overline{IS}_B}{\sqrt{\hat{\sigma}_A^2/n_A + \hat{\sigma}_B^2/n_B}}$$

where $n_A$ and $n_B$ are sample sizes in the datasets A and B, $\sigma_A^2$ and $\sigma_B^2$ are the implementation shortfall variances in datasets A and B, and assuming $n_A=n_B$, $\sigma_A^2=\sigma_B^2$, and $\alpha=0.05$, a sample size of at least $$n_A \geq \frac{2\hat{\sigma}_A^2(z_{0.975} + z_{1-\beta})^2}{\Delta^2}$$

to achieve a test with a minimum power of $1-\beta$, where $z_\gamma$ is the lower $\gamma$ quantile of the standard normal distribution.

Example parameters that may be used in the AB testing include: minimum differences to evaluate are $\Delta=0.5$, 1.0, or 2.0 basis points (bps). The variance in execution IS for the control arm ($\sigma_A^2$) can be estimated from historical data. Rolling 2-month empirical IS standard deviations from 2020 range from $\hat{\sigma}_A \in [29.1, 30.6]$ bps with a mean of ~29.59 bps. One thing worth noting is that monthly empirical IS in 2020 is very volatile in March and April, so the data used for the aforementioned estimation may start from August 2020 to represent more recent market condition. A cut-off of 0.5% may be applied to remove extreme values, which is consistent with the assumption of the original model. It is also assumed that $\sigma_A^2=\sigma_B^2$ for simplicity, and thus $\hat{\sigma}_A^2=\hat{\sigma}_B^2$. Table 1 shows example sample sizes of datasets used in an AB test.

TABLE 1

Example Sample Sizes in AB test
Sample sizes - Two-sided, $H_A$: $\Delta \neq 0$, 80% power

| $\hat{\sigma}_A$ | $\Delta = 0.5$ | $\Delta = 1.0$ | $\Delta = 2.0$ |
|---|---|---|---|
| 29.1 (min) | 53,417 | 13,287 | 3,322 |
| 29.59 (avg) | 54,960 | 13,740 | 3,435 |
| 30.6 (max) | 58,661 | 14,665 | 3,666 |

As shown in Table 1, trades per month for 2020 varies between 18,036 (min) and 20,968 (max). Assuming average standard deviation levels ($\hat{\sigma}_A=29.59$) the percentage of trades ending up in the control arm (a max of 50% to be feasible) of the AB Test then varies as shown in Table 2.

TABLE 2

Example Outcome of AB Test
% Overall trades in control - Two-sided,
$H_A$: $\Delta \neq 0$, 80% power, $\hat{\sigma}_A = 29.59$

| Time frame | $\Delta = 0.5$, $n_A = 54,960$ | | $\Delta = 1.0$, $n_A = 13,740$ | | $\Delta = 2.0$, $n_A = 3,435$ | |
|---|---|---|---|---|---|---|
| | Min % | Max % | Min % | Max % | Min % | Max % |
| 1-month | Insufficient | Insufficient | Insufficient | Insufficient | 16.4% | 19.0% |
| 2-month | Insufficient | Insufficient | 32.8% | 38.1% | 8.2% | 9.5% |
| 3-month | Insufficient | Insufficient | 21.8% | 25.4% | 5.5% | 6.3% |

Therefore, based on Tables 1-2, a 2-month or 3-month experiment targeting a minimum 1 bps average IS savings may be recommended as the AB Test to evaluate trading impact of the trade order style recommendation described in FIGS. 1-8. These options are acceptable in that they require 20-40% of trades to be in the control arm, so the majority of orders receive the IGSOR recommendation feature in full.

Figure 10:
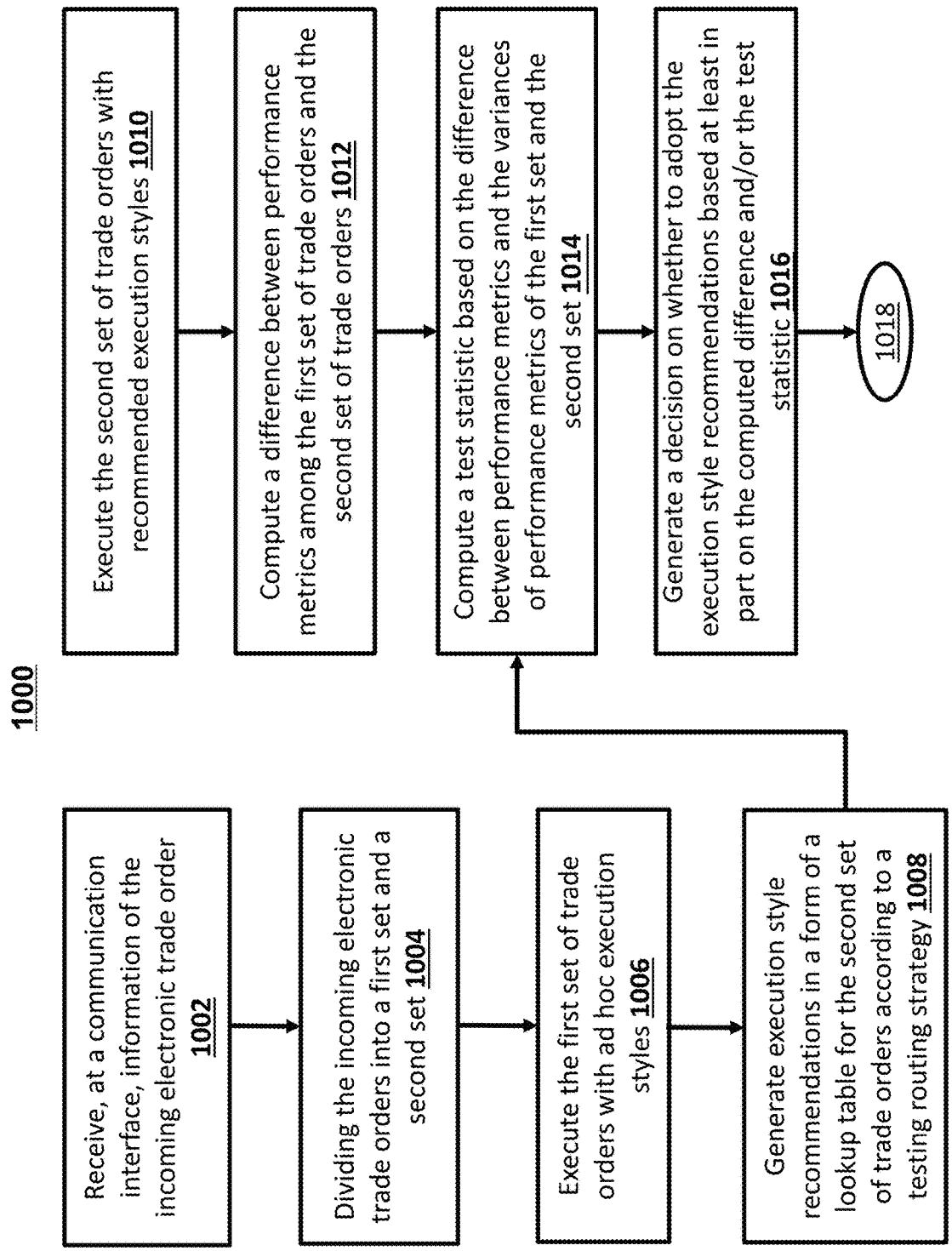
FIG. 10 is a simplified logic flow diagram illustrating a method of AB testing for choosing a trade order routing option, according to one embodiment described herein.
Figure 10:
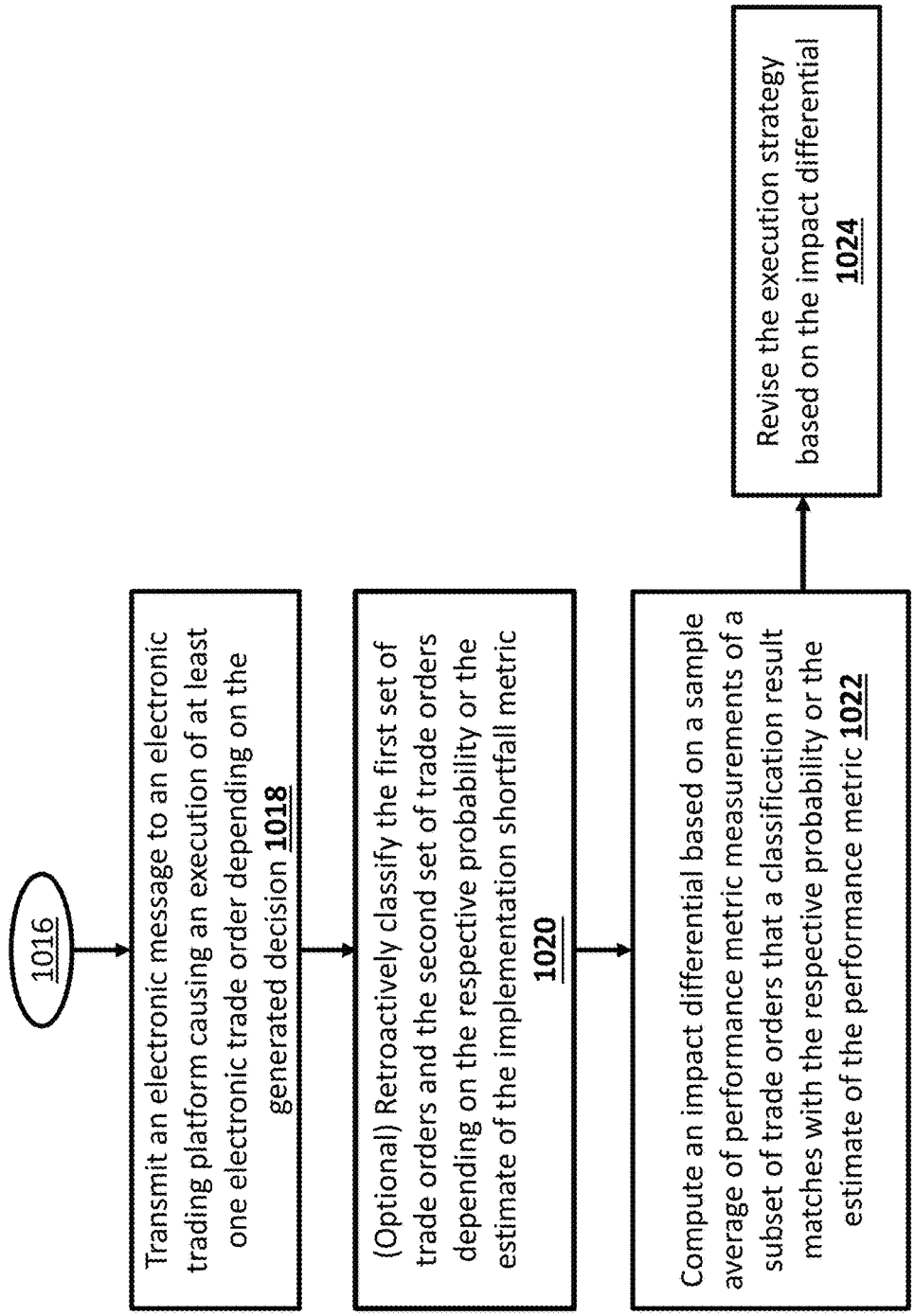

FIG. 10 is a simplified logic flow diagram illustrating a method of AB testing for choosing a trade order routing option, according to one embodiment described herein. One or more of the process 1000 may be implemented, at least in part, in the form of executable code stored on non-transitory, tangible, machine-readable media that when run by one or more processors may cause the one or more processors to perform one or more of the processes. In some embodiments, process 1000 may be performed by a testing mechanism implemented with the trade order routing modules including 104 and 105 at server 130 in FIGS. 1-2. It is worth noting that additional processes, steps and/or implementations may be omitted, performed in a different sequence, or combined as desired or appropriate.

At step 1002, information of incoming electronic trade orders may be received at a communication interface. For example, example information of trade orders may be provided from a daily delivery file, or a historical data record. Example information of trades may include the trade date, delivery lookup-table version/location, (CUSIP, side, size bucket)—i.e. the delivery key, trade identifier (block id), experiment group assignment (dataset A or B, or not in experiment)—based on the delivery key, trade order execution style suggestion (Auto, RFQ Voice), actual execution style (Auto, RFQ Voice)—measurable post-execution, IS models recommendation (Auto, RFQ Voice), propensity model recommendation (Auto, RFQ Voice), actual execution IS—measurable post-execution, trader feedback—any trader feedback on the recommendation via an open comment field, and/or the like.

At step 1004, the incoming electronic trade orders may be randomly divided into a first set and a second set, e.g., a control dataset A 902 and a treatment/test dataset B 904.

At step 1006, the first set of trade orders may be executed with ad hoc execution styles, e.g., without exposing the trader to any trade style recommendations.

At step 1008, execution style recommendations maybe generated in a form of a lookup table for the second set of trade orders according to a testing routing strategy. For example, the execution style recommendation may be generated according to method 700 in FIG. 7. For example, the execution style recommendations are generated by a statistical model based on attributes including any combination of: a side value, an original trade size, a price change in dollar terms in response to change in spread by a single basis point, a wallet spread, a coupon rate, an amount issued, a rating, and/or the like.

At step 1010, the second set of trade orders may be executed with recommended execution styles. For example, the trader may be exposed to the recommended execution style before making an execution decision, or a trade order is automatically executed according to the recommended execution style.

At step 1012, a difference between performance metrics among the first set of trade orders and the second set of trade orders may be computed. For example, the performance metrics may include a mean execution implementation shortfalls, sales of the trade order, and/or the like.

At step 1014, a test statistic may be computed based on the difference between performance metric mean and variances of the first set and the second set. Specifically, the first set or the second set has a sample size no smaller than a threshold computed based on a configurable control level of a test corresponding to a different performance quantile level.

At step 1016, a decision on whether to adopt the recommended execution style may be made based at least in part on the computed difference and the test statistic. For example, when the test statistic indicates that trade performance has improved than a threshold, the execution style recommendation mechanism may continue to be adopted.

At step 1018, an electronic message to an electronic trading platform causing an execution of a future electronic trade order depending on the generated decision may be transmitted to the communication interface, determining whether the future trade shall adopt the execution style recommendation.

At step 1020, the first set of trade orders and the second set of trade orders may be (optionally) retroactively classified depending on the respective probability or the estimate of the performance metrics. Specifically, the execution style recommendation depends on combining output from (i) a set of IS models and (ii) a style propensity model, which aims to replicate current trading patterns. In post-hoc analysis of AB Test results, subsets of trades may be analyzed where the recommendation either matches that of (ii), or does not. When it does not match, it implicates that an execution pattern differs from the status quo; in those cases the average IS savings may be higher than in cases where it matches. A saving differential can thus be estimated in these cases from post-hoc analysis.

At step 1022, an impact differential may be computed based on a sample average of performance metric measurements of a subset of trade orders that a classification result matches with the respective probability or the estimate of the performance metric. For example, datasets A and B trades may be retrospectively classified according to their execution style recommendation and propensity-based recommendation, then the impact differentials are estimated based on the sample average IS measurements within each subcategory, as shown in Table 3:

TABLE 3

Post-Hoc Analysis

| IGSOR rec. | Propensity rec. | Match | # trades in A | # trades in B | $\hat{\Delta}$ |
|---|---|---|---|---|---|
| Auto | Auto | Yes | $n_A^{(Auto,Auto)}$ | $n_B^{(Auto,Auto)}$ | $\overline{IS}_A^{(Auto,Auto)} - \overline{IS}_B^{(Auto,Auto)}$ |
| Auto | RFQ | No | $n_A^{(Auto,RFQ)}$ | $n_B^{(Auto,RFQ)}$ | $\overline{IS}_A^{(Auto,RFQ)} - \overline{IS}_B^{(Auto,RFQ)}$ |
| Auto | Voice | No | $n_A^{(Auto,Voice)}$ | $n_B^{(Auto,Voice)}$ | $\overline{IS}_A^{(Auto,Voice)} - \overline{IS}_B^{(Auto,Voice)}$ |
| RFQ | RFQ | Yes | $n_A^{(RFQ,RFQ)}$ | $n_B^{(RFQ,RFQ)}$ | $\overline{IS}_A^{(RFQ,RFQ)} - \overline{IS}_B^{(RFQ,RFQ)}$ |
| ... | | | | | |

At step 1024, the execution strategy may be revised based on the impact differential.

Figure 11A:
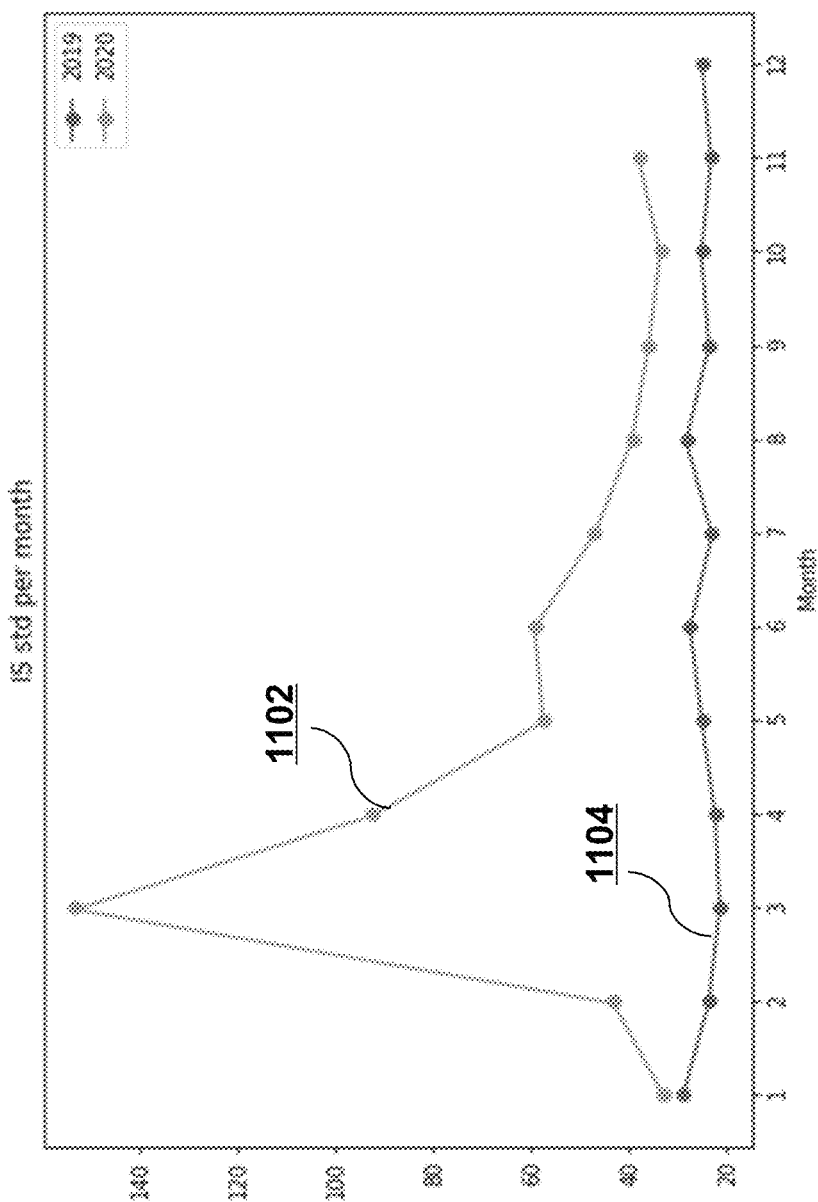
FIGS. 11A-11C provide example performance charts relating to the trades based on a control dataset and a treatment dataset, according to embodiments described herein.

FIG. 11A provides an example data plot illustrating the monthly standard deviation implementation shortfall metric over 2019 (plot 1104) and 2020 (plot 1102), according to one embodiment described herein. It is shown that March and April may be more volatile and the gap between 2019 and 2020 finally narrowed in August 2020. Note that as trades may fall unevenly within delivery keys, the number of keys may be determined to assign to each experiment group to pick up the minimum number of trades calculated above. This can be done empirically based on repeated, random sampling from historical control data. Analysis of repeated historical samples will be based on for calculating a more exact proportion of trades expected to be affected.

In one embodiment, traders may access a dashboard application via a personal device (e.g., 210 in FIG. 2) to manage their trades. Incoming orders sit on a queue waiting to be picked up by traders, and traders are able to manipulate orders (e.g. by splitting or merging orders) at their discretion. The vast majority of orders are executed within the trading day on which they are authorized, but a small proportion carry forward to the next day. With the execution style recommendation, traders will receive incoming orders in the dashboard application, the majority of which will receive an execution recommendation (Auto, RFQ or Voice) within a new column of information—these are orders that have been randomly assigned to the B group (testing) 904. The recommendation will update every time an order is merged or split, and at the beginning of a new trading day. A smaller proportion of incoming orders (e.g., <40%) are in the control group (dataset A 902) and will receive no recommendation (blank). The AB test as shown at diagram 900 will run for 2-3 months, after which the execution recommendation will be made available on all incoming orders.

Figure 11B:
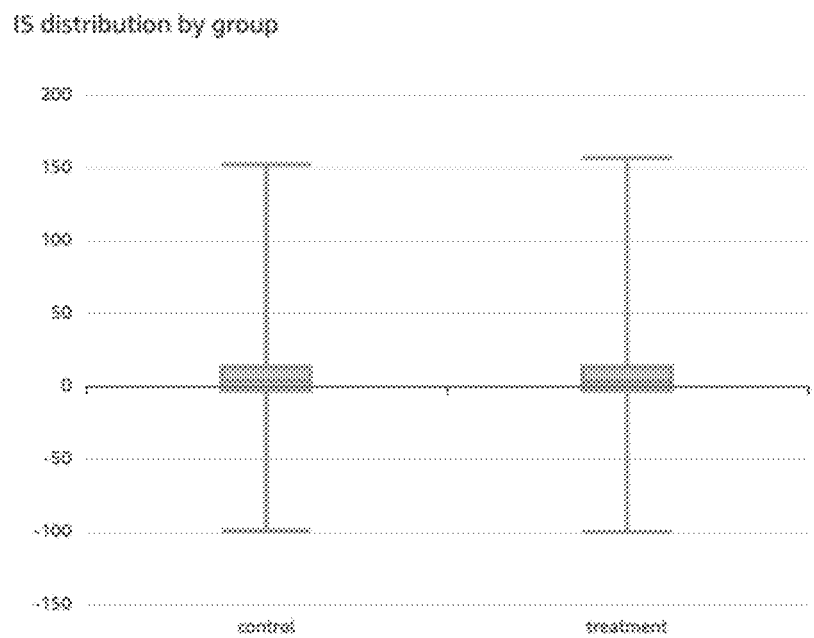
Figure 11C:
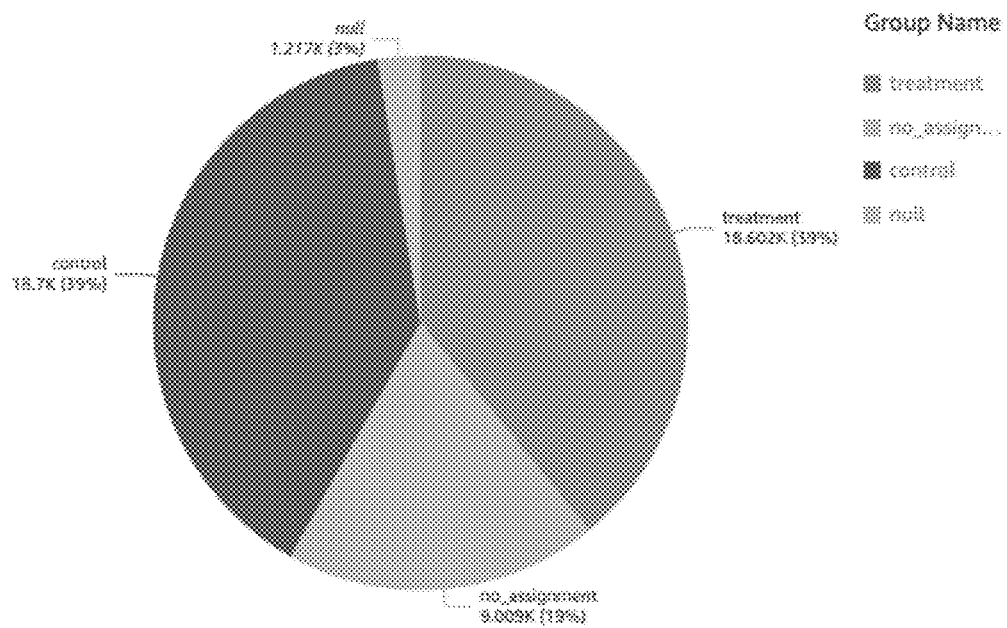

For example, FIG. 11B shows an example implementation shortfall distributions corresponding to trades from the control set (902) and treatment set (904), respectively. FIG. 11C shows an example pie chart illustrating the count of trades corresponding to the control set (902) and treatment set (904).

Computer Environment

Figure 12:
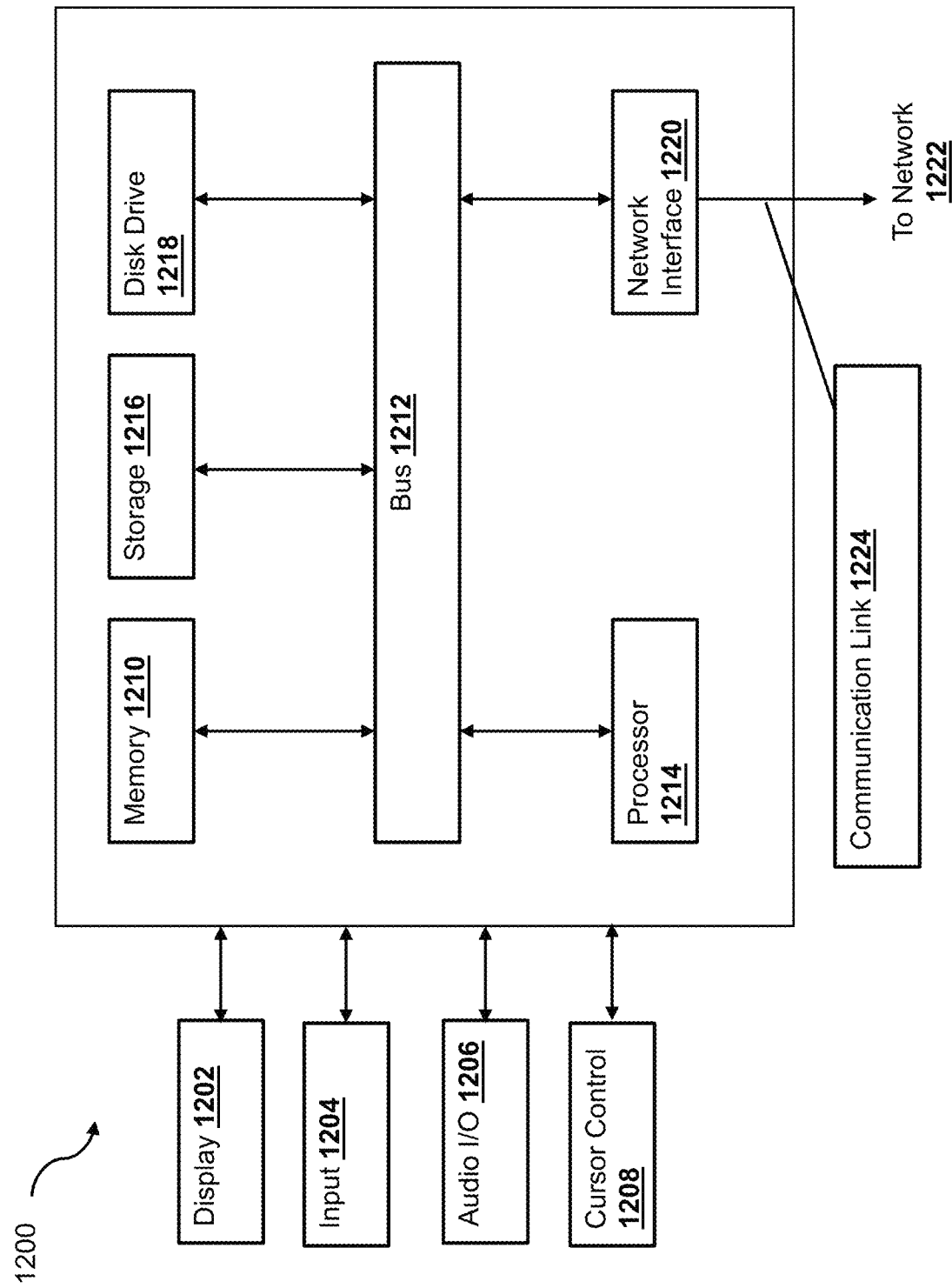
FIG. 12 is a block diagram illustrating example components of a computing device for implementing embodiments described herein, according to one embodiment described herein.

FIG. 12 is a block diagram of a computer system suitable for implementing one or more components performing one or more processes described in FIGS. 1-11, according to an embodiment. In various embodiments, the communication device may comprise a personal computing device (e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 1200 in a manner as follows.

The computer system 1200 includes a bus 1212 or other communication mechanism for communicating information data, signals, and information between various components of the computer system 1200. The components include an input/output (I/O) component 1204 that processes a user (i.e., sender, recipient, service provider) action, such as selecting keys from a keypad/keyboard, selecting one or more buttons or links, etc., and sends a corresponding signal to the bus 1212. The I/O component 1204 may also include an output component, such as a display 1202 and a cursor control 1208 (such as a keyboard, keypad, mouse, etc.). The display 1202 may be configured to present a login page for logging into a user account or a checkout page for purchasing an item from a merchant. An optional audio input/output component 1206 may also be included to allow a user to use voice for inputting information by converting audio signals. The audio I/O component 1206 may allow the user to hear audio. A transceiver or network interface 1220 transmits and receives signals between the computer system 1200 and other devices, such as another user device, a merchant server, or a service provider server via network 1222. In one embodiment, the transmission is wireless, although other transmission mediums and methods may also be suitable. A processor 1214, which can be a micro-controller, digital signal processor (DSP), or other processing component, processes these various signals, such as for display on the computer system 1200 or transmission to other devices via a communication link 1224. The processor 1214 may also control transmission of information, such as cookies or IP addresses, to other devices.

The components of the computer system 1200 also include a system memory component 1210 (e.g., RAM), a static storage component 1216 (e.g., ROM), and/or a disk drive 1218 (e.g., a solid-state drive, a hard drive). The computer system 1200 performs specific operations by the processor 1214 and other components by executing one or more sequences of instructions contained in the system memory component 1210. For example, the processor 1214 can perform the position detection of webpage elements described herein according to the process 300.

Logic may be encoded in a computer readable medium, which may refer to any medium that participates in providing instructions to the processor 1214 for execution. Such a medium may take many forms, including but not limited to, non-volatile media, volatile media, and transmission media. In various implementations, non-volatile media includes optical or magnetic disks, volatile media includes dynamic memory, such as the system memory component 1210, and transmission media includes coaxial cables, copper wire, and fiber optics, including wires that comprise the bus 1212. In one embodiment, the logic is encoded in non-transitory computer readable medium. In one example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by the computer system 1200. In various other embodiments of the present disclosure, a plurality of computer systems 1200 coupled by the communication link 1224 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems comprising one or more memories storing various information described herein and one or more processors coupled to the one or more memories and a network, wherein the one or more processors are operable to perform steps as described herein, as non-transitory machine-readable medium comprising a plurality of machine-readable instructions which, when executed by one or more processors, are adapted to cause the one or more processors to perform a method comprising steps described herein, and methods performed by one or more devices, such as a hardware processor, user device, server, and other devices described herein.

What is claimed is:

1. A method of electronically routing an incoming electronic trade order, the method comprising:
receiving, at a communication interface of a routing server, information of incoming electronic trade orders and a training dataset of historical trade data;
training a machine learning model implemented at the routing server using historical patterns of trade costs from the training dataset of historical trade data;
randomly dividing, at the routing server, the incoming electronic trade orders into a first set and a second set;

routing, via the communication interface of the routing server, the first set of trade orders to one or more trade execution entities each corresponding to a different execution style in an ad hoc manner;

generating, by the machine learning model implemented at the routing server, execution style recommendations in a form of a lookup table for the second set of trade orders according to a testing routing strategy;

routing, via the communication interface of the routing server, the second set of trade orders to corresponding trade execution entities based on the execution style recommendations;

computing a difference between performance metrics among the first set of trade orders and the second set of trade orders;

generating a decision on whether to adopt the machine learning model generated execution style recommendations based at least in part on the computed difference; and routing, via the communication interface of the routing server, a new incoming electronic trade order to a particular trade execution entity based on a recommended execution style predicted by the machine learning model causing an execution of the new incoming electronic trade order using the recommended execution style, when the decision indicates to adopt the machine learning model generated execution style recommendations.

2. The method of claim 1, wherein the execution style recommendations are selected from a set of execution styles including an auto-execution style, a request for quote style, and a direct voice-activated style.

3. The method of claim 1, wherein the performance metrics may include any of:
   a mean execution implementation shortfall associated with a trade order; or
   sales of a set of trade orders.

4. The method of claim 1, wherein the execution style recommendations are generated by a statistical model based on attributes including any combination of:
   a side value,
   an original trade size,
   a price change in dollar terms in response to change in spread by a single basis point,
   a wallet spread,
   a coupon rate,
   an amount issued, and
   a rating.

5. The method of claim 1, further comprising:
   computing a test statistic based on the difference between mean execution implementation shortfalls and implementation shortfall variances of the first set and the second set.

6. The method of claim 4, wherein the first set or the second set has a sample size no smaller than a threshold computed based on a configurable control level of a test corresponding to a different performance quantile level.

7. The method of claim 1, wherein the execution style recommendations are generated by combining (i) a respective probability indicating a likelihood that a trade order is to be executed under each execution style from a set of execution styles; and (ii) an estimate of an implementation shortfall metric for the trade order under the respective execution style.

8. The method of claim 6, further comprising:
   retroactively classifying the first set of trade orders and the second set of trade orders depending on the respective probability or the estimate of the performance metrics; and
   computing an impact differential based on a sample average of performance metric measurements of a subset of trade orders that a classification result matches with the respective probability or the estimate of the performance metric.

9. A system of routing an incoming electronic trade order, the system comprising:
   a communication interface receiving information of incoming electronic trade orders and a training dataset of historical trade data;
   a memory storing a plurality of processor-executable instructions; and
   a processor executing the plurality of processor-executable instructions to perform operations comprising:
      training a machine learning model implemented at the routing server using historical patterns of trade costs from the training dataset of historical trade data;
      routing, via the communication interface, the first set of trade orders to one or more trade execution entities each corresponding to a different execution style in an ad hoc manner;
      generating, by a machine learning model implemented on one or more processors, execution style recommendations in a form of a lookup table for the second set of trade orders according to a testing routing strategy;
      routing, via the communication interface, the second set of trade orders to corresponding trade execution entities based on the execution style recommendations;
      computing a difference between performance metrics among the first set of trade orders and the second set of trade orders;
      generating a decision on whether to adopt the machine learning model generated execution style recommendations based at least in part on the computed difference; and
      routing, via the communication interface, a new incoming electronic trade order to a particular trade execution entity based on a recommended execution style predicted by the machine learning model causing an execution of the new incoming electronic trade order using the recommended execution style, when the decision indicates to adopt the machine learning model generated execution style recommendations.

10. The system of claim 9, wherein the execution style recommendations are selected from a set of execution styles including an auto-execution style, a request for quote style, and a direct voice-activated style.

11. The system of claim 9, wherein the performance metrics may include any of:
    a mean execution implementation shortfall associated with a trade order; or
    sales of a set of trade orders.

12. The system of claim 9, wherein the execution style recommendations are generated by a statistical model based on attributes including any combination of:
    a side value,
    an original trade size,
    a price change in dollar terms in response to change in spread by a single basis point,
    a wallet spread,
    a coupon rate, an amount issued, and a rating.

13. The system of claim 9, wherein the operations further comprise:

computing a test statistic based on the difference between mean execution implementation shortfalls and implementation shortfall variances of the first set and the second set.

14. The system of claim 13, wherein the first set or the second set has a sample size no smaller than a threshold computed based on a configurable control level of a test corresponding to a different performance quantile level.

15. The system of claim 9, wherein the execution style recommendations are generated by combining (i) a respective probability indicating a likelihood that a trade order is to be executed under each execution style from a set of execution styles; and (ii) an estimate of an implementation shortfall metric for the trade order under the respective execution style.

16. The system of claim 15, wherein the operations further comprise:

retroactively classifying the first set of trade orders and the second set of trade orders depending on the respective probability or the estimate of the performance metrics; and computing an impact differential based on a sample average of performance metric measurements of a subset of trade orders that a classification result matches with the respective probability or the estimate of the performance metric.

17. A non-transitory processor-readable storage medium storing a plurality of processor-executable instructions for routing an incoming electronic trade order, the instructions being executed by a processor to perform operations comprising:

receiving, at a communication interface of a routing server, information of incoming electronic trade orders and a training dataset of historical trade data;

training a machine learning model implemented at the routing server using historical patterns of trade costs from the training dataset of historical trade data;

randomly dividing, at the routing server, the incoming electronic trade orders into a first set and a second set;

routing, via the communication interface of the routing server, the first set of trade orders to one or more trade execution entities each corresponding to a different execution style in an ad hoc manner;

generating, by a machine learning model implemented at the routing server, execution style recommendations in a form of a lookup table for the second set of trade orders according to a testing routing strategy;

routing, via the communication interface of the routing server, the second set of trade orders to corresponding trade execution entities based on the execution style recommendations;

computing a difference between performance metrics among the first set of trade orders and the second set of trade orders;

generating a decision on whether to adopt the machine learning model generated execution style recommendations based at least in part on the computed difference; and routing, via the communication interface of the routing server, a new incoming electronic trade order to a particular trade execution entity based on a recommended execution style predicted by the machine learning model causing an execution of the new incoming electronic trade order using the recommended execution style, when the decision indicates to adopt the machine learning model generated execution style recommendations.

18. The non-transitory processor-readable storage medium of claim 17, wherein the execution style recommendations are selected from a set of execution styles including an auto-execution style, a request for quote style, and a direct voice-activated style.

19. The non-transitory processor-readable storage medium of claim 17, wherein the performance metrics may include any of:

a mean execution implementation shortfall associated with a trade order; or sales of a set of trade orders.

20. The non-transitory processor-readable storage medium of claim 17, wherein the operations further comprise:

computing a test statistic based on the difference between mean execution implementation shortfalls and implementation shortfall variances of the first set and the second set.

\* \* \* \* \*